(12) United States Patent
Mikhail et al.

(10) Patent No.: US 7,246,324 B2
(45) Date of Patent: Jul. 17, 2007

(54) METHOD AND SYSTEM FOR DATA CAPTURE WITH HIDDEN APPLETS

(75) Inventors: Grinshetyn Mikhail, New York, NY (US); Matthias E. Chang, New York, NY (US); Hok Yee Wong, Hartsdale, NY (US); Anthony Chao, New York, NY (US); Mark Graham, Scarsdale, NY (US)

(73) Assignee: JPMorgan Chase Bank, New York, NY (US)

( * ) Notice: Subject to any disclaimer, the term of this patent is extended or adjusted under 35 U.S.C. 154(b) by 660 days.

(21) Appl. No.: 10/153,932

(22) Filed: May 23, 2002

(65) Prior Publication Data

US 2003/0218633 A1 Nov. 27, 2003

(51) Int. Cl.
*G06F 3/00* (2006.01)
*G06F 15/16* (2006.01)

(52) U.S. Cl. .............. 715/760; 715/744; 715/748; 715/733; 715/513; 709/219

(58) Field of Classification Search ................ 715/505, 715/513, 700, 733, 738, 748, 749, 760, 762, 715/764, 765, 781, 788, 806, 901, 902, 744; 709/201, 203, 219; 719/315, 331, 332
See application file for complete search history.

(56) References Cited

U.S. PATENT DOCUMENTS

| | | | |
|---|---|---|---|
| 3,896,266 A | 7/1975 | Waterbury | |
| 3,938,091 A | 2/1976 | Atalla et al. | |
| 4,321,672 A | 3/1982 | Braun et al. | |
| 4,567,359 A | 1/1986 | Lockwood | |
| 4,633,397 A | 12/1986 | Macco | |
| 4,695,880 A | 9/1987 | Johnson et al. | |
| 4,696,491 A | 9/1987 | Stenger | |
| 4,713,761 A | 12/1987 | Sharpe et al. | |
| 4,725,719 A | 2/1988 | Oncken et al. | |
| 4,745,468 A | 5/1988 | Von Kohorn | |
| 4,799,156 A | 1/1989 | Shavit | |

(Continued)

FOREIGN PATENT DOCUMENTS

DE 197 31 293 1/1999

(Continued)

OTHER PUBLICATIONS

Tom Tessier, "Sharing data between Web page frames using JavaScript", May 1996, Miller Freeman, Dr. Dobb's Journal, vol. 21, No. 5, p. 72, 74-5, 86-7.*

(Continued)

*Primary Examiner*—Lucila X. Bautista
(74) *Attorney, Agent, or Firm*—Hunton & Williams

(57) ABSTRACT

A method and system for data display and data capture using applets within hidden frames on a browser. A visible frame and two invisible frames are passed to a client in response to an http request. The visible frame may include multiple layers. The hidden frames contain applets such as Java Server programs (JSP), but do not contain any visible html. Static data that is used for data display and data selection (e.g. pick boxes) is contained within one hidden frame. An applet, such as JSP within the other hidden frame provides an interface between the visible frame and the server to retrieve dynamic data, or verify data entry.

13 Claims, 20 Drawing Sheets

U.S. PATENT DOCUMENTS

| | | |
|---|---|---|
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,784,562 A | 7/1998 | Diener |
| 5,787,403 A | 7/1998 | Randle |
| 5,787,404 A | 7/1998 | Fernandez-Holmann |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |

| | | | | | |
|---|---|---|---|---|---|
| 5,832,460 A | 11/1998 | Bednar | 5,960,411 A | 9/1999 | Hartman et al. |
| 5,832,476 A | 11/1998 | Tada | 5,961,593 A | 10/1999 | Gabber et al. |
| 5,835,087 A | 11/1998 | Herz | 5,963,635 A | 10/1999 | Szlam et al. |
| 5,835,580 A | 11/1998 | Fraser | 5,963,925 A | 10/1999 | Kolling et al. |
| 5,835,603 A | 11/1998 | Coutts | 5,963,952 A | 10/1999 | Smith |
| 5,838,334 A * | 11/1998 | Dye .......................... 345/503 | 5,963,953 A | 10/1999 | Cram et al. |
| 5,838,906 A | 11/1998 | Doyle | 5,966,695 A | 10/1999 | Melchione et al. |
| 5,842,178 A | 11/1998 | Giovannoli | 5,966,699 A | 10/1999 | Zandi |
| 5,842,211 A | 11/1998 | Horadan | 5,967,896 A | 10/1999 | Jorasch et al. |
| 5,844,553 A | 12/1998 | Hao | 5,969,318 A | 10/1999 | Mackenthun |
| 5,845,259 A | 12/1998 | West et al. | 5,970,143 A | 10/1999 | Schneier et al. |
| 5,845,260 A | 12/1998 | Nakano et al. | 5,970,470 A | 10/1999 | Walker et al. |
| 5,847,709 A | 12/1998 | Card | 5,970,478 A | 10/1999 | Walker et al. |
| 5,848,143 A | 12/1998 | Andrews | 5,970,482 A | 10/1999 | Pham |
| 5,848,400 A | 12/1998 | Chang | 5,970,483 A | 10/1999 | Evans |
| 5,848,427 A | 12/1998 | Hyodo | 5,978,467 A | 11/1999 | Walker et al. |
| 5,852,812 A | 12/1998 | Reeder | 5,983,196 A | 11/1999 | Wendkos |
| 5,857,079 A | 1/1999 | Claus et al. | 5,987,434 A | 11/1999 | Libman |
| 5,862,223 A | 1/1999 | Walker | 5,987,498 A | 11/1999 | Athing et al. |
| 5,864,830 A | 1/1999 | Armetta et al. | 5,991,736 A | 11/1999 | Ferguson et al. |
| RE36,116 E | 2/1999 | McCarthy | 5,991,738 A | 11/1999 | Ogram |
| 5,870,718 A | 2/1999 | Spector | 5,991,748 A | 11/1999 | Taskett |
| 5,870,724 A | 2/1999 | Lawlor | 5,991,751 A | 11/1999 | Rivette et al. |
| 5,870,725 A | 2/1999 | Belinger et al. | 5,991,780 A | 11/1999 | Rivette |
| 5,871,398 A | 2/1999 | Schneier et al. | 5,995,948 A | 11/1999 | Whitford |
| 5,873,072 A | 2/1999 | Kight | 5,995,976 A | 11/1999 | Walker et al. |
| 5,873,096 A | 2/1999 | Lim | 5,999,596 A | 12/1999 | Walker et al. |
| 5,880,769 A | 3/1999 | Nemirofsky | 5,999,907 A | 12/1999 | Donner |
| 5,883,810 A | 3/1999 | Franklin et al. | 6,000,033 A | 12/1999 | Kelly et al. |
| 5,884,032 A | 3/1999 | Bateman | 6,001,016 A | 12/1999 | Walker et al. |
| 5,884,270 A | 3/1999 | Walker et al. | 6,003,762 A | 12/1999 | Hayashida |
| 5,884,272 A | 3/1999 | Walker et al. | 6,005,939 A | 12/1999 | Fortenberry et al. |
| 5,884,274 A | 3/1999 | Walker et al. | 6,006,205 A | 12/1999 | Loeb et al. |
| 5,884,288 A | 3/1999 | Chang | 6,006,249 A | 12/1999 | Leong |
| 5,889,863 A | 3/1999 | Weber | 6,009,415 A | 12/1999 | Shurling et al. |
| 5,892,900 A | 4/1999 | Ginter et al. | 6,009,442 A | 12/1999 | Chen et al. |
| 5,898,780 A | 4/1999 | Liu et al. | 6,010,404 A | 1/2000 | Walker et al. |
| 5,899,982 A | 5/1999 | Randle | 6,012,088 A | 1/2000 | Li et al. |
| 5,903,881 A | 5/1999 | Schrader | 6,012,983 A | 1/2000 | Walker et al. |
| 5,909,486 A | 6/1999 | Walker et al. | 6,014,439 A | 1/2000 | Walker et al. |
| 5,910,988 A | 6/1999 | Ballard | 6,014,635 A | 1/2000 | Harris et al. |
| 5,913,202 A | 6/1999 | Motoyama | 6,014,636 A | 1/2000 | Reeder |
| 5,914,472 A | 6/1999 | Foladare et al. | 6,014,638 A | 1/2000 | Burge et al. |
| 5,915,244 A | 6/1999 | Jack et al. | 6,014,641 A | 1/2000 | Loeb et al. |
| 5,918,214 A | 6/1999 | Perkowski | 6,014,645 A | 1/2000 | Cunningham |
| 5,918,217 A | 6/1999 | Maggioncalda | 6,016,810 A | 1/2000 | Ravenscroft |
| 5,918,239 A | 6/1999 | Allen et al. | 6,018,714 A | 1/2000 | Risen, Jr. |
| 5,920,847 A | 7/1999 | Kolling et al. | 6,018,718 A | 1/2000 | Walker et al. |
| 5,921,864 A | 7/1999 | Walker et al. | 6,024,640 A | 2/2000 | Walker et al. |
| 5,923,763 A | 7/1999 | Walker et al. | 6,026,398 A | 2/2000 | Brown et al. |
| 5,926,796 A | 7/1999 | Walker et al. | 6,026,429 A | 2/2000 | Jones et al. |
| 5,926,812 A | 7/1999 | Hilsenrath | 6,032,134 A | 2/2000 | Weissman |
| 5,930,764 A | 7/1999 | Melchione | 6,032,147 A | 2/2000 | Williams et al. |
| 5,933,816 A | 8/1999 | Zeanah | 6,038,547 A | 3/2000 | Casto |
| 5,933,817 A | 8/1999 | Hucal | 6,038,552 A | 3/2000 | Fleischl et al. |
| 5,933,823 A | 8/1999 | Cullen | 6,042,006 A | 3/2000 | Van Tilburg et al. |
| 5,933,827 A | 8/1999 | Cole | 6,044,362 A | 3/2000 | Neely |
| 5,940,812 A | 8/1999 | Tengel et al. | 6,045,039 A | 4/2000 | Stinson et al. |
| 5,943,656 A | 8/1999 | Crooks | 6,049,778 A | 4/2000 | Walker et al. |
| 5,944,824 A | 8/1999 | He | 6,049,782 A | 4/2000 | Gottesman et al. |
| 5,945,653 A | 8/1999 | Walker et al. | 6,049,835 A | 4/2000 | Gagnon |
| 5,946,388 A | 8/1999 | Walker et al. | 6,055,637 A | 4/2000 | Hudson et al. |
| 5,947,747 A | 9/1999 | Walker et al. | 6,061,665 A | 5/2000 | Bahreman |
| 5,949,044 A | 9/1999 | Walker et al. | 6,064,987 A | 5/2000 | Walker et al. |
| 5,949,875 A | 9/1999 | Walker et al. | 6,065,120 A | 5/2000 | Laursen et al. |
| 5,950,173 A | 9/1999 | Perkowski | 6,065,675 A | 5/2000 | Teicher |
| 5,950,174 A | 9/1999 | Brendzel | 6,070,147 A | 5/2000 | Harms et al. |
| 5,950,206 A | 9/1999 | Krause | 6,070,153 A | 5/2000 | Simpson |
| 5,952,639 A | 9/1999 | Ohki | 6,070,244 A | 5/2000 | Orchier et al. |
| 5,952,641 A | 9/1999 | Korshun | 6,073,105 A | 6/2000 | Sutcliffe et al. |
| 5,953,710 A | 9/1999 | Fleming | 6,073,113 A | 6/2000 | Guinan |
| 5,956,695 A | 9/1999 | Carrithers et al. | 6,075,519 A | 6/2000 | Okatani et al. |
| 5,958,007 A | 9/1999 | Lee et al. | 6,076,072 A | 6/2000 | Libman |

| Patent | Date | Name |
|---|---|---|
| 6,081,790 A | 6/2000 | Rosen |
| 6,081,810 A | 6/2000 | Rosenzweig et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,182 A | 12/2000 | Nadooshan |
| 6,164,533 A | 12/2000 | Barton |
| 6,170,011 B1 | 1/2001 | Beck et al. |
| 6,178,432 B1 * | 1/2001 | Cook et al. ............... 715/513 |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,227,447 B1 | 5/2001 | Campisano |
| 6,230,148 B1 | 5/2001 | Pare et al. |
| 6,239,797 B1 * | 5/2001 | Hills et al. ............... 715/784 |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,272,493 B1 * | 8/2001 | Pasquali ............... 707/10 |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditsky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,449,765 B1 | 9/2002 | Ballard |
| 6,453,353 B1 | 9/2002 | Win et al. |
| 6,460,141 B1 | 10/2002 | Olden |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,510,523 B1 | 1/2003 | Perlman et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,592,044 B1 | 7/2003 | Wong et al. |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,668,322 B1 | 12/2003 | Wood et al. |
| 6,687,222 B1 | 2/2004 | Albert et al. |
| 6,718,482 B2 | 4/2004 | Sato et al. |
| 6,718,535 B1 | 4/2004 | Underwood |
| 6,725,269 B1 | 4/2004 | Megiddo |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,766,370 B2 | 7/2004 | Glommen et al. |
| 6,772,146 B2 | 8/2004 | Khemlani et al. |
| 6,785,810 B1 | 8/2004 | Lirov et al. |
| 6,785,891 B1 * | 8/2004 | Allen et al. ............... 719/313 |
| 6,789,115 B1 | 9/2004 | Singer et al. |
| 6,805,288 B2 | 10/2004 | Routhenstein et al. |
| 6,810,395 B1 | 10/2004 | Bharat |
| 6,820,202 B1 | 11/2004 | Wheeler et al. |
| 6,832,202 B1 | 12/2004 | Schuyler et al. |
| 6,856,970 B1 | 2/2005 | Campbell et al. |

| | | | |
|---|---|---|---|
| 6,892,231 B2 | 5/2005 | Jager | |
| 6,907,566 B1 | 6/2005 | McElfresh et al. | |
| 6,925,481 B2 | 8/2005 | Singhal et al. | |
| 6,983,421 B1* | 1/2006 | Lahti et al. | 715/763 |
| 7,020,696 B1 | 3/2006 | Perry et al. | |
| 2001/0012974 A1 | 8/2001 | Mahaffey | |
| 2001/0016873 A1* | 8/2001 | Ohkado et al. | 709/205 |
| 2001/0027474 A1* | 10/2001 | Nachman et al. | 709/204 |
| 2001/0032184 A1 | 10/2001 | Tenembaum | |
| 2001/0047295 A1 | 11/2001 | Tenembaum | |
| 2001/0051917 A1 | 12/2001 | Bissonette et al. | |
| 2001/0054003 A1 | 12/2001 | Chien et al. | |
| 2002/0007313 A1 | 1/2002 | Mai et al. | |
| 2002/0007393 A1* | 1/2002 | Hamel | 709/203 |
| 2002/0007460 A1 | 1/2002 | Azuma | |
| 2002/0010599 A1 | 1/2002 | Levison | |
| 2002/0010668 A1 | 1/2002 | Travis et al. | |
| 2002/0018585 A1 | 2/2002 | Kim | |
| 2002/0019938 A1 | 2/2002 | Aarons | |
| 2002/0023108 A1 | 2/2002 | Daswani et al. | |
| 2002/0032613 A1 | 3/2002 | Buettgenbach et al. | |
| 2002/0032650 A1 | 3/2002 | Hauser et al. | |
| 2002/0032655 A1* | 3/2002 | Antonin et al. | 705/43 |
| 2002/0059141 A1 | 5/2002 | Davies et al. | |
| 2002/0077978 A1 | 6/2002 | O'Leary et al. | |
| 2002/0099826 A1 | 7/2002 | Summers et al. | |
| 2002/0104006 A1 | 8/2002 | Boate et al. | |
| 2002/0104017 A1 | 8/2002 | Stefan | |
| 2002/0107788 A1 | 8/2002 | Cunningham | |
| 2002/0152163 A1 | 10/2002 | Bezos et al. | |
| 2002/0152239 A1* | 10/2002 | Bautista-Lloyd et al. | 707/513 |
| 2002/0165949 A1 | 11/2002 | Na | |
| 2002/0174010 A1 | 11/2002 | Rice, III | |
| 2002/0184507 A1 | 12/2002 | Makower et al. | |
| 2002/0188869 A1 | 12/2002 | Patrick | |
| 2002/0191548 A1 | 12/2002 | Ylonen et al. | |
| 2003/0001888 A1* | 1/2003 | Power | 345/744 |
| 2003/0004272 A1* | 1/2003 | Power | 525/192 |
| 2003/0009533 A1* | 1/2003 | Shuster | 709/217 |
| 2003/0018714 A1* | 1/2003 | Mikhailov et al. | 709/203 |
| 2003/0018915 A1 | 1/2003 | Stoll | |
| 2003/0023880 A1 | 1/2003 | Edward et al. | |
| 2003/0034388 A1 | 2/2003 | Routhenstein et al. | |
| 2003/0037142 A1 | 2/2003 | Munger et al. | |
| 2003/0046587 A1 | 3/2003 | Bheemarasetti et al. | |
| 2003/0046589 A1 | 3/2003 | Gregg | |
| 2003/0051026 A1 | 3/2003 | Carter et al. | |
| 2003/0070069 A1 | 4/2003 | Belapurkar et al. | |
| 2003/0070084 A1 | 4/2003 | Satomaa et al. | |
| 2003/0074580 A1 | 4/2003 | Knouse et al. | |
| 2003/0079147 A1 | 4/2003 | Hsieh et al. | |
| 2003/0084345 A1 | 5/2003 | Bjornestad et al. | |
| 2003/0084647 A1 | 5/2003 | Smith et al. | |
| 2003/0088552 A1 | 5/2003 | Bennett et al. | |
| 2003/0093585 A1* | 5/2003 | Allan | 709/330 |
| 2003/0105981 A1 | 6/2003 | Miller et al. | |
| 2003/0110399 A1 | 6/2003 | Rail | |
| 2003/0115160 A1 | 6/2003 | Nowlin et al. | |
| 2003/0119642 A1 | 6/2003 | Gates et al. | |
| 2003/0149749 A1* | 8/2003 | Cartucci et al. | 709/219 |
| 2003/0154403 A1 | 8/2003 | Keinsley et al. | |
| 2003/0159072 A1 | 8/2003 | Bellinger et al. | |
| 2003/0163733 A1 | 8/2003 | Barriga-Caceres et al. | |
| 2003/0177067 A1 | 9/2003 | Cowell et al. | |
| 2003/0191549 A1 | 10/2003 | Otsuka et al. | |
| 2004/0031856 A1 | 2/2004 | Atsmon et al. | |
| 2004/0117409 A1* | 6/2004 | Scahill et al. | 707/200 |
| 2004/0117439 A1* | 6/2004 | Levett | 709/203 |
| 2004/0215740 A1* | 10/2004 | Frank et al. | 709/217 |
| 2005/0080747 A1 | 4/2005 | Anderson et al. | |
| 2005/0082362 A1 | 4/2005 | Anderson et al. | |
| 2005/0086160 A1 | 4/2005 | Wong et al. | |
| 2005/0086177 A1 | 4/2005 | Anderson et al. | |
| 2005/0278641 A1* | 12/2005 | Mansour et al. | 715/749 |

FOREIGN PATENT DOCUMENTS

| | | |
|---|---|---|
| EP | 0 884 877 | 12/1998 |
| EP | 0 917 119 | 5/1999 |
| EP | 1 022 664 | 7/2000 |
| EP | 1022664 A2 * | 7/2000 |
| JP | H10-187467 | 7/1998 |
| JP | 2005-242976 | 9/2005 |
| WO | WO 97/43736 | 11/1997 |
| WO | WO 99/40507 * | 8/1999 |
| WO | WO 99/40507 A1 | 8/1999 |
| WO | WO 99/52051 | 10/1999 |
| WO | WO 00/68858 | 11/2000 |
| WO | WO 01/18656 A1 * | 3/2001 |
| WO | WO 01/35355 | 5/2001 |
| WO | WO 01/43084 | 6/2001 |
| WO | WO 01/88659 | 11/2001 |
| WO | WO 02/17082 A1 * | 2/2002 |
| WO | WO 2004/079603 | 9/2004 |

OTHER PUBLICATIONS

"Data access component framework", Feb. 2001, Research Disclosure No. 442010.*

"Updating live HTML pages incrementally with data from Web Servers", May 2000, Research Disclosure No. 433095.*

Kutler, A Different Drummer on the Data Highway, American Banker, Section: No. 91, vol. 160, May 12, 1995, p. 14.

Epper, A Player Goes After Big Bucks in Cyberspace, American Banker, vol. 160, No. 86, ISSN: 0002-7561, May 5, 1995, p. 17.

Berry et al., A potent new tool for selling databse, Business Week, Cover Story, Sep. 5, 1994, pp. 56-62.

Applets, java.sun.com, May 21, 1999.

Associates National Bank (DE) Credit Card, The Associates, www.theassociates.com/consumer/credit_cards/main.html, Apr. 6, 1999, 6 pages.

At Your Request, www.wingspanbank.com, Sep. 28, 1999.

ANONYMOUS, Aversion Therapy: Banks Overcoming Fear of the 'Net to Develop Safe Internet-based Payment System w/ Netscape Communicator, Network World, ISSN: 0887-7661, Dec. 12, 1994.

JAVA, Banking on JAVA(TM) Technology, java.sun.com, May 21, 1999.

Bechtel Construction Operations Incorporated Standardizes on Primavera's Expedition Contract Management Software, Business Wire, Jul. 27, 1999.

ANONYMOUS, CORBA Overview, arch2.htm at pent21.infosys.tuwien.ac.at. May 25, 1999.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Bank, Cash, Check,Charge—What's Next?, Seattle Times, Mar. 6, 1995.

Marlin, Chasing Document Management, Inform. vol. 13, No. 4, Apr. 199, p. 76-83.

Consortium Created to Manage Common Electronic Purse Specifications, http://www.visa.com/av/news/PRmisc051199.vhtml, printed Feb. 23, 2001.

Construction Financing to Build Your Own Home, ISBN: 0962864307, Jul. 1990.

Civitello Jr., Construction Operations Manual of Policies and Procedures, Third Edition, 2000.

Marchman, Construction Scheduling with Primavera Project Planner, May 25, 1999.

Chester, Cross-platform integration with XML and SOAP, IT PTO Sep. 10, 2001.

Mitchell, Cyberspace: Crafting Software . . . , Business Week, Feb. 27, 1995, pp. 78-86.

Friedman, Dictionary of Business Terms, Barron's Third Edition, Copyright 2000.

Strassel, Dutch Software Concern Experiments with Electronic 'Cash' in Cyberspace, The Wall Street Journal, Apr. 17, 1995.

Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999.
Maize, Fannie Mae on the Web, Document ID: 52079, May 8, 1995.
FreeMarkets, printed on Apr. 26, 1999.
The Gale Group, G&D American's Multi-application Smart Card Selected for Combined Payroll and 'Virtual Banking' Program in Mexico, Business Wire, Apr. 24, 1998, p241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Radosevich, Is Work Flow Working?, CNN.com, Apr. 6, 1999 at <http://www.cnn.com/TECH/computing/9904/06/workflow/ent. idg, p. 1 of 5, retrieved from the internet on Nov. 28, 2005.
JAVA, JAVA(TM) Technology in the Real World, java.sun.com, May 21, 1999.
JAVA, JAVA(TM) Remote Method Invocation (RMI) Interface, java.sun.com, 05/32/99.
JAVA, JAVA(TM) Servlet API, java.sun.com, May 21, 1999.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barham, Network Brings Together Producers and Companies, Document ID: 17347.
Houlder, Oft Gives the Individual Top Priority: Report Calls for Deregulation of Business Lending, Document ID: 91716, Jun. 8, 1994.
OMWARE, Inc., Web Pages, Feb. 2000, Retrieved from http://web.archive.org/web20000226033405/www.omware.com/products.html, Retrieved from the interneet on Nov. 28, 2005.
ANONYMOUS, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999), 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Thomas Publishing Company, SoluSource: For Engineers By Engineers, Thomas Publishing Company, Apr. 26, 1999.
JAVA, Staying in Touch with JNDI, java.sun.com, May 21, 1999.
Summary of The At Your Request Architecture, First USA Bank Confidential and Proprietary, Apr. 2, 1999, pp. 1-8.
Temporary Global Passwords, IBM Corporation, IBM TDB v36, n3, 03-93, Order 93A 60636, Mar. 1, 1993, pp. 451-454.
JAVA, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Tdoay, vol. 12, No. 3 ISSN: 8755-6286, Mar. 1, 1995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
Welcome to MUSE, Apr. 26, 1999.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
eCharge, eCharge Corporation, www.echarge.com, Dec. 3, 1999.

* cited by examiner

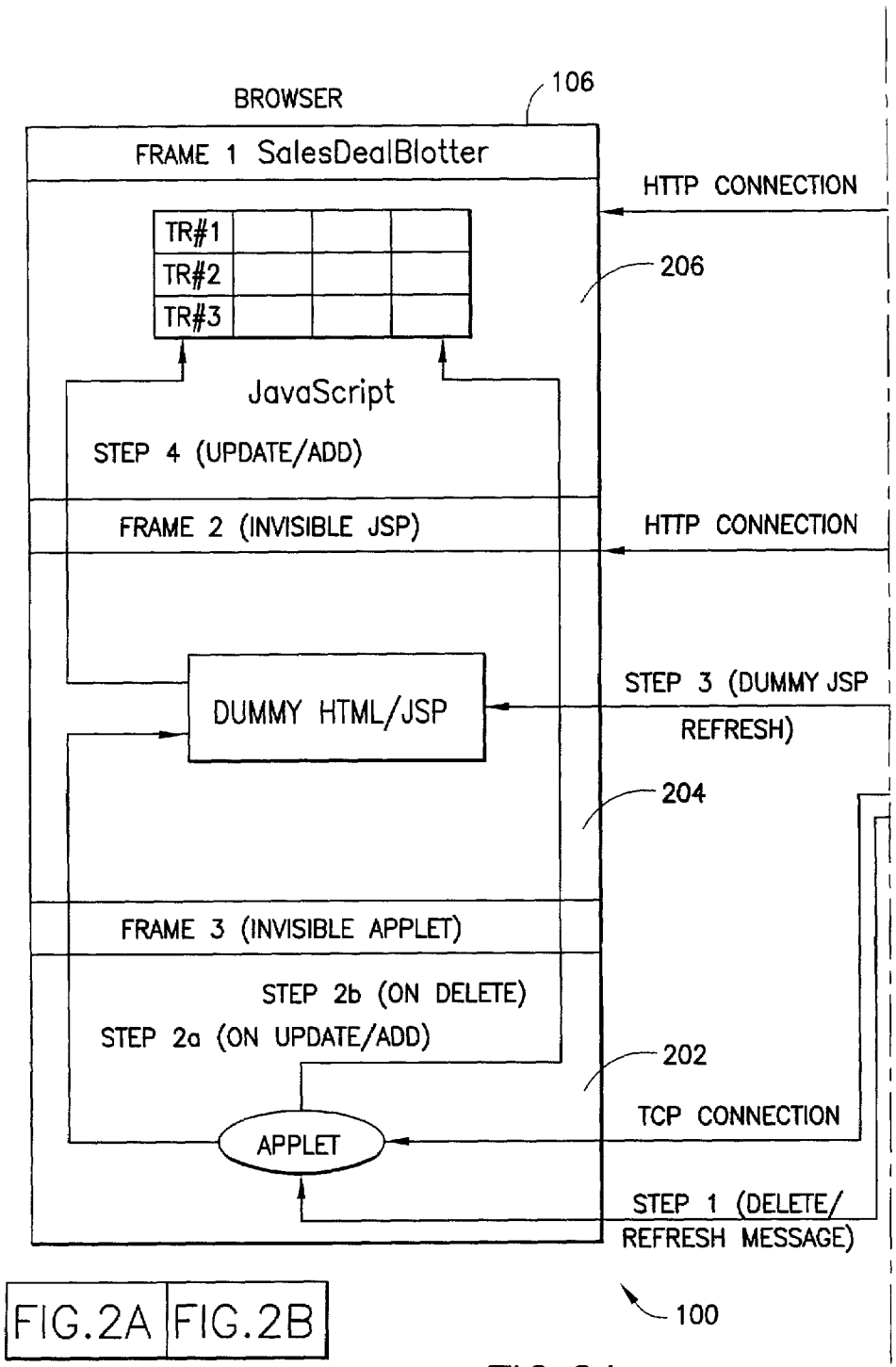

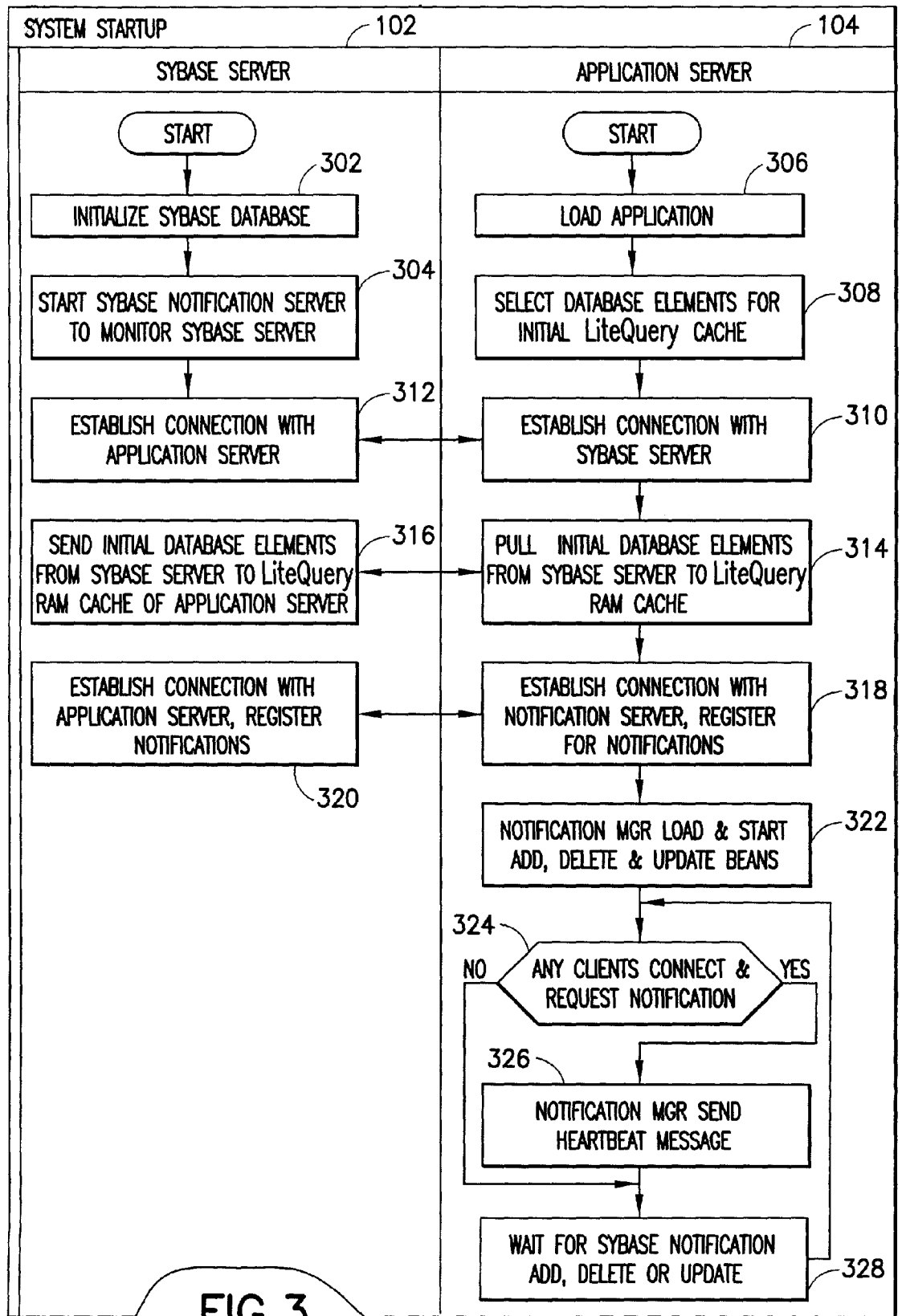

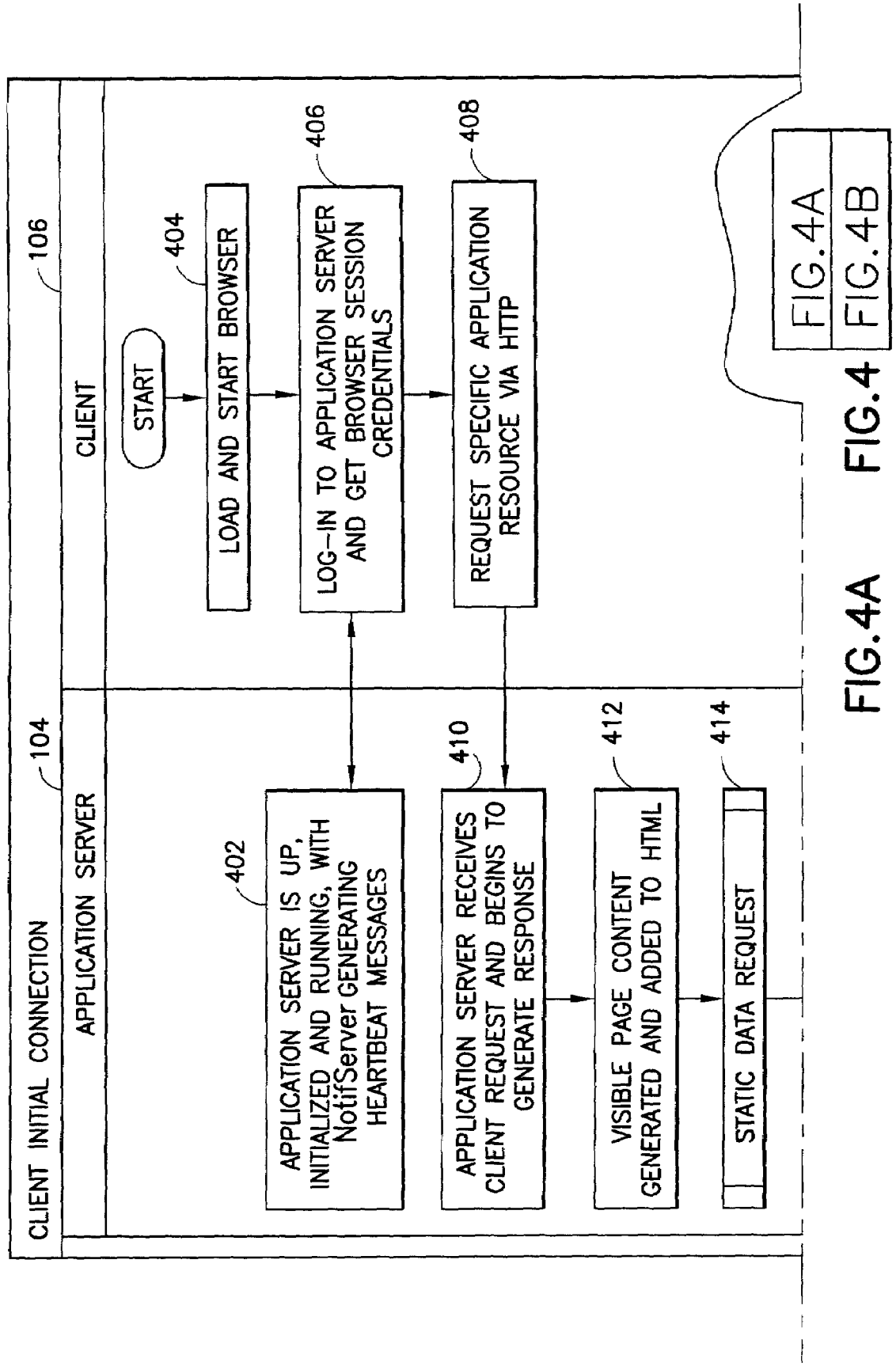

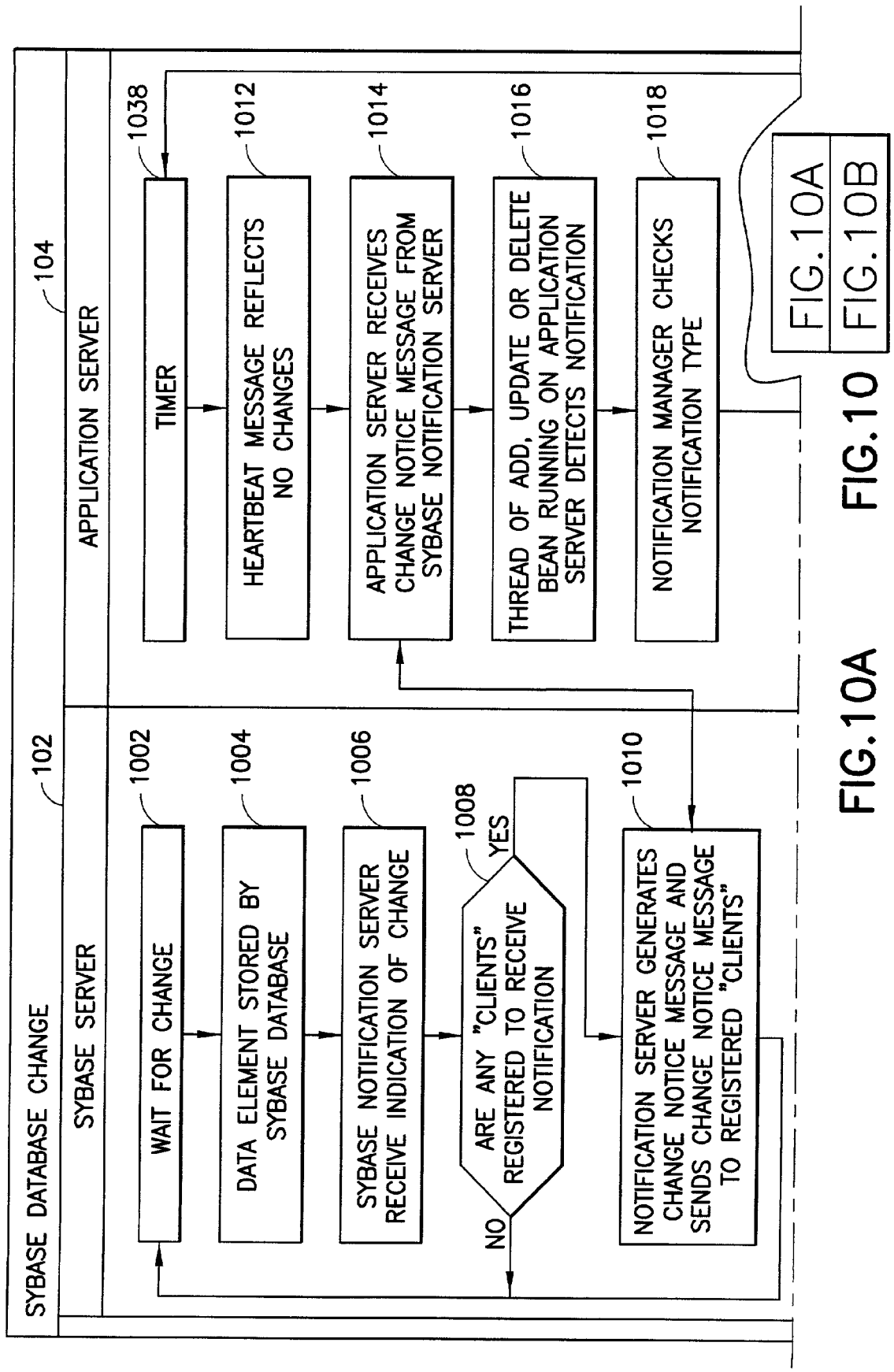

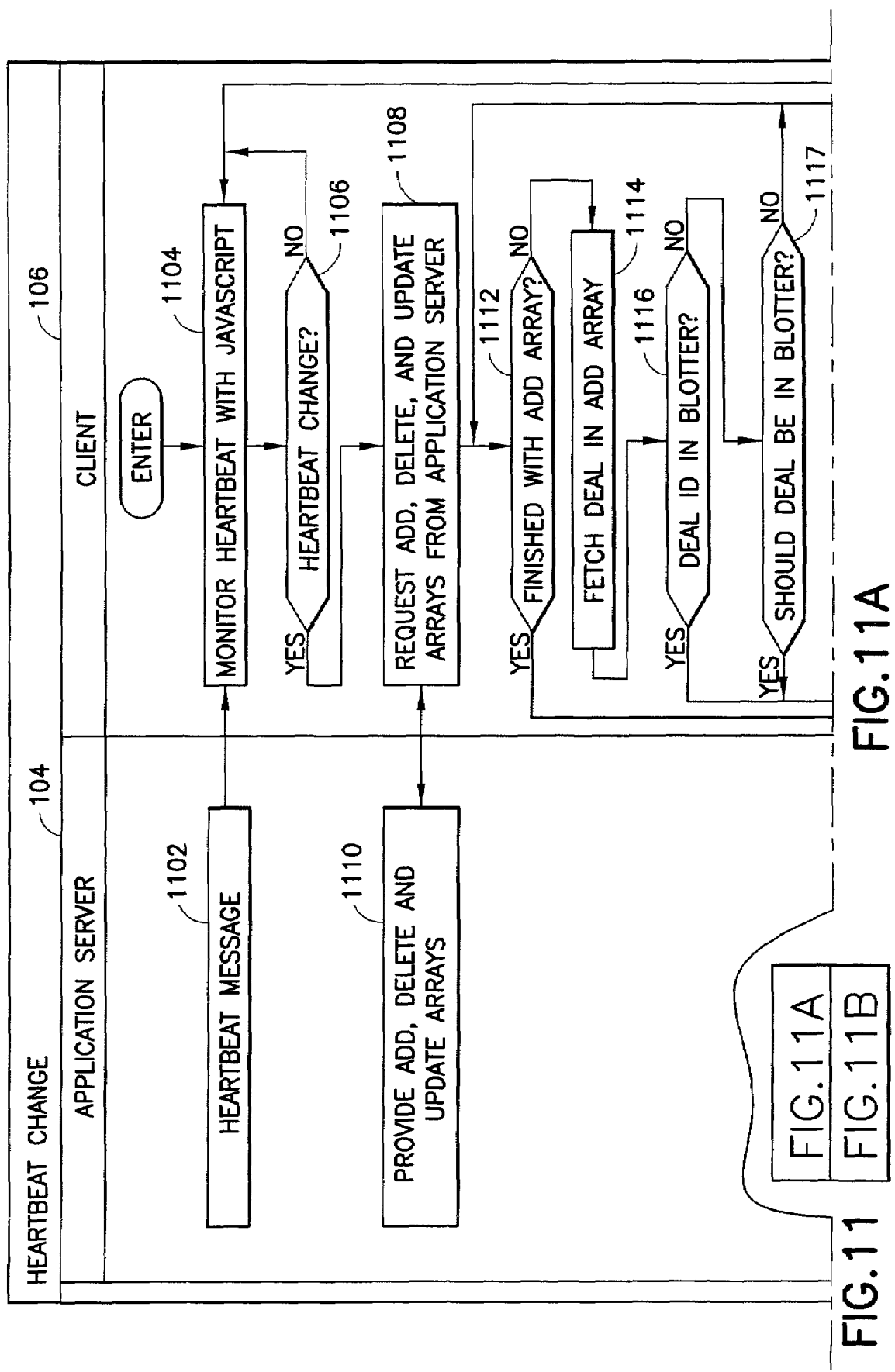

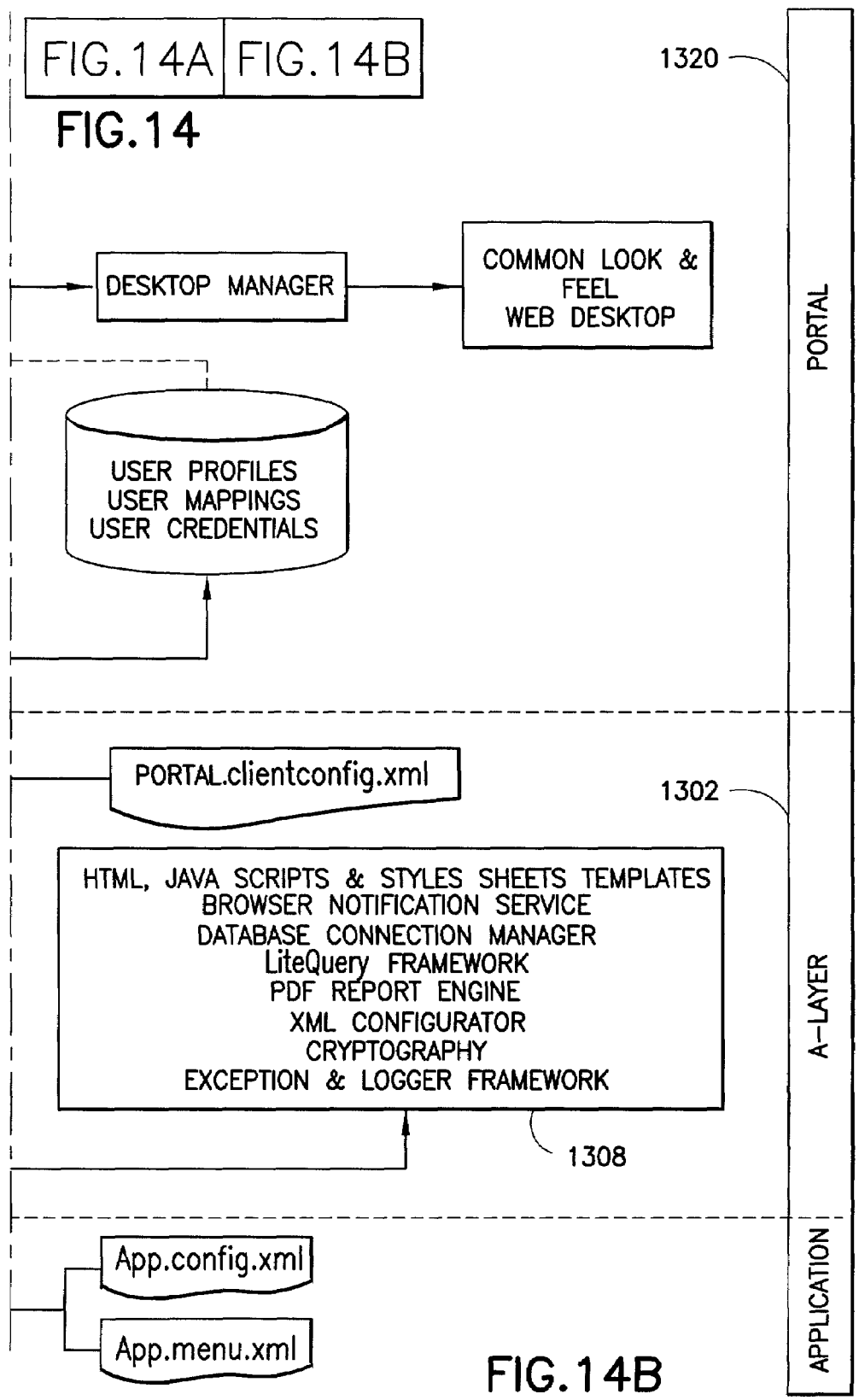

METHOD AND SYSTEM FOR DATA CAPTURE WITH HIDDEN APPLETS

BACKGROUND

1. Field of the Invention

The present invention relates to multi-computer network interaction, and more particularly to networked client-server architectures.

2. Description of the Related Art

In client-server computing and enterprise architectures, data caching is known. What is needed is a method and system to provide data cache of information that is routinely required, and adding data cache based on query.

In client-server computing and enterprise architectures, periodic browser content refresh is known. What is needed is a method and system to provide browser content refresh that is based on change of the underlying data, rather than an arbitrary refresh cycle such as time.

In client-server computing and enterprise architectures, techniques for validation of data entry are known. What is needed is an efficient method and system to validate data entry of static and dynamic data before submission of a trade or transaction.

The preceding description is not to be construed as an admission that any of the description is prior art relative to the present invention.

SUMMARY OF THE INVENTION

In one embodiment, the invention provides a method for data display on a client computer. The method comprises sending html from a server to a client, the html including code for a visible frame and at least one invisible frame. Rendering the visible frame on a browser of the client; and populating a field of the visible frame with data from the invisible frame.

In one embodiment, the invention provides a method for data display on a client compute. The method comprises sending html from a server to a client, the html including code for a visible frame, a first invisible frame and a second invisible frame; rendering the visible frame on a browser of the client; populating a first field of the visible frame with static data, the static data contained within the first invisible frame; and populating a second field of the visible frame with dynamic data, the dynamic data retrieved by code within the second invisible frame.

In one embodiment, the invention provides a method for data display on a client computer. The method comprises, responsive to a request from a client, sending html from a server to the client, the html including: html code for a visible frame including multiple layers; javascript for a first invisible frame; and javascript for a second invisible frame; rendering the visible frame from the html code on a browser of the client with at least one layer rendered behind a topmost layer so as to cover the layer in back; populating a first field of the topmost layer of the visible frame with static data, the static data contained within the javascript for the first invisible frame; populating a second field of the topmost layer of the visible frame with dynamic data, the dynamic data not contained within the html, or javascript, the javascript for the second invisible frame retrieving the dynamic data.

BRIEF DESCRIPTION OF THE DRAWINGS

The foregoing features and other aspects of the invention are explained in the following description taken in conjunction with the accompanying figures wherein:

FIG. 3 illustrates steps in a method according to one embodiment of the invention;

It is understood that the drawings are for illustration only and are not limiting.

DETAILED DESCRIPTION OF THE DRAWINGS

Figure 1:
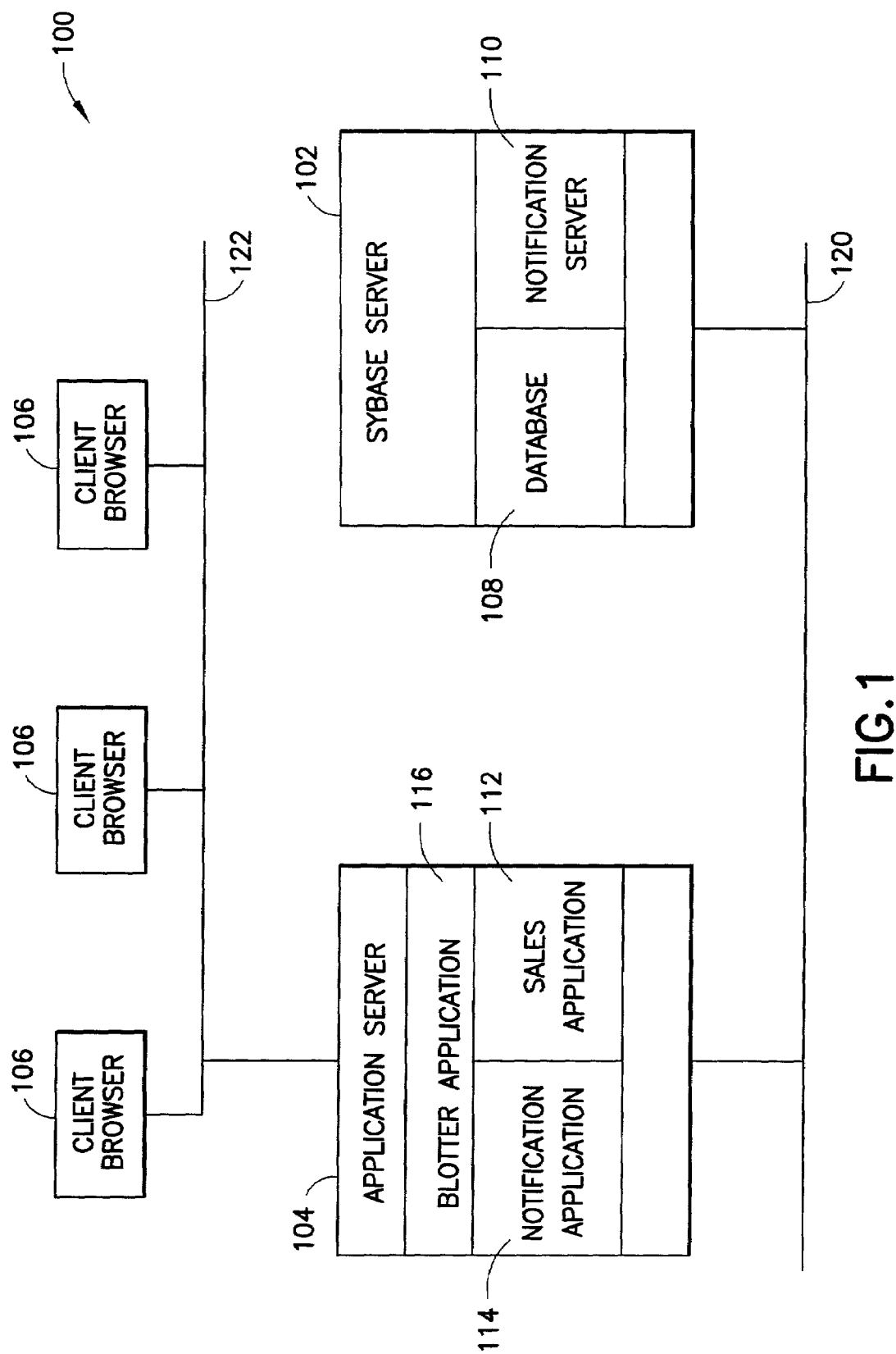
FIG. 1 illustrates an overview of a system according to one embodiment of the invention.

Referring to FIG. 1, one embodiment of system 100 of the invention includes a Sybase server 102 connected to application server 104 by network 120. Client 106 with a browser application is connected to application server 104 by network 122. In one embodiment, network 122 is the Internet. Network 120 may also be the Internet, or it may be a private network, such as a LAN or WAN. Although not illustrated in the figure, it is possible for Sybase server 102 to be connected to client 106 by network 122. However, for security and interoperability reasons, it is more common for client browser 106 to have access to Sybase server 102 only thru application server 104. Sybase server 102 includes multiple programs or applications, such as Sybase database 108 and a notification server 110. Application server 104 also includes multiple programs, such as trading applications 112, 116 and notification application 114.

Throughout the embodiments described in this description, server 102 is referred to as Sybase server 102. Sybase is a particular server brand, available from Sybase Inc. of Berkeley, Calif., and there is nothing particularly unique about a Sybase server that limits server 102 to only a Sybase server.

For many businesses and organizations, a large portion of their information processing and management, which is integral to their day-to-day operations, uses web-based application components. For these businesses and organizations, providing uniform standards and services for those web-based application components is very important. Uniform standards and services allow application developers to focus on development, deployment and maintenance of applications without re-creating common components that are frequently used by other applications. Uniform standards and services also provide a more consistent user interface for the various web-based applications.

Figure 13A:
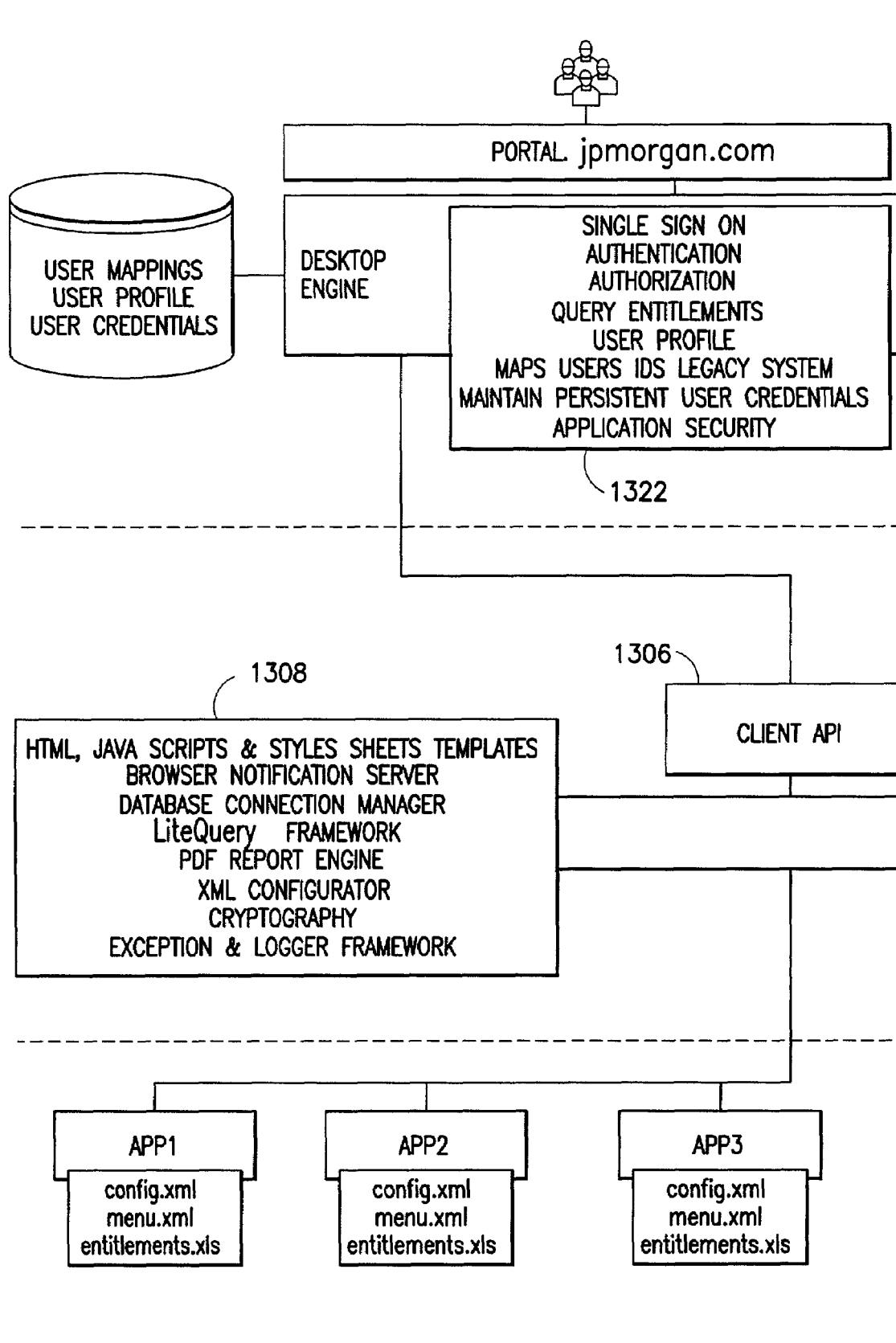
FIG. 13 illustrates interactions of various aspects of the invention.
Figures 13, 13B:
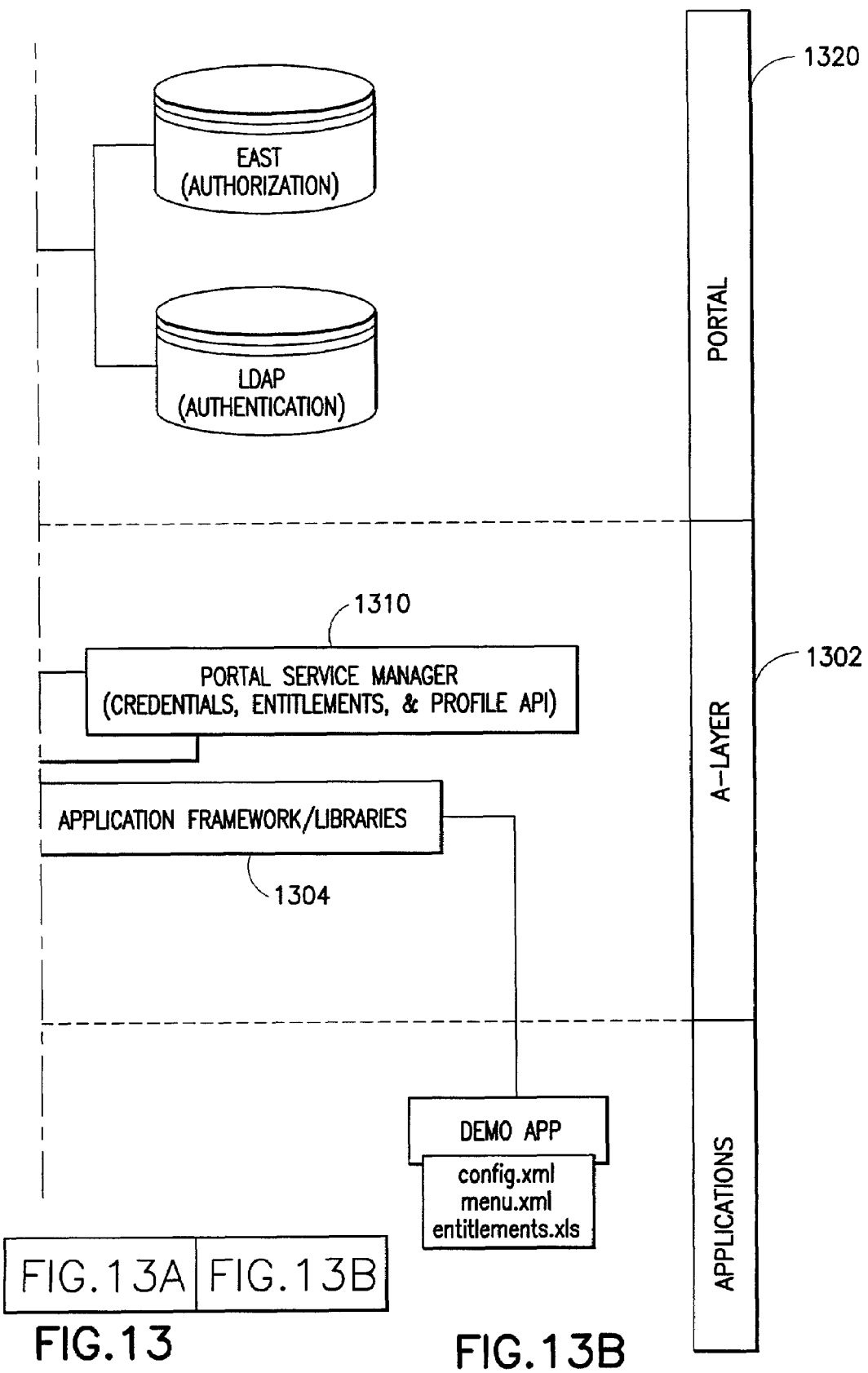
Figure 14A:
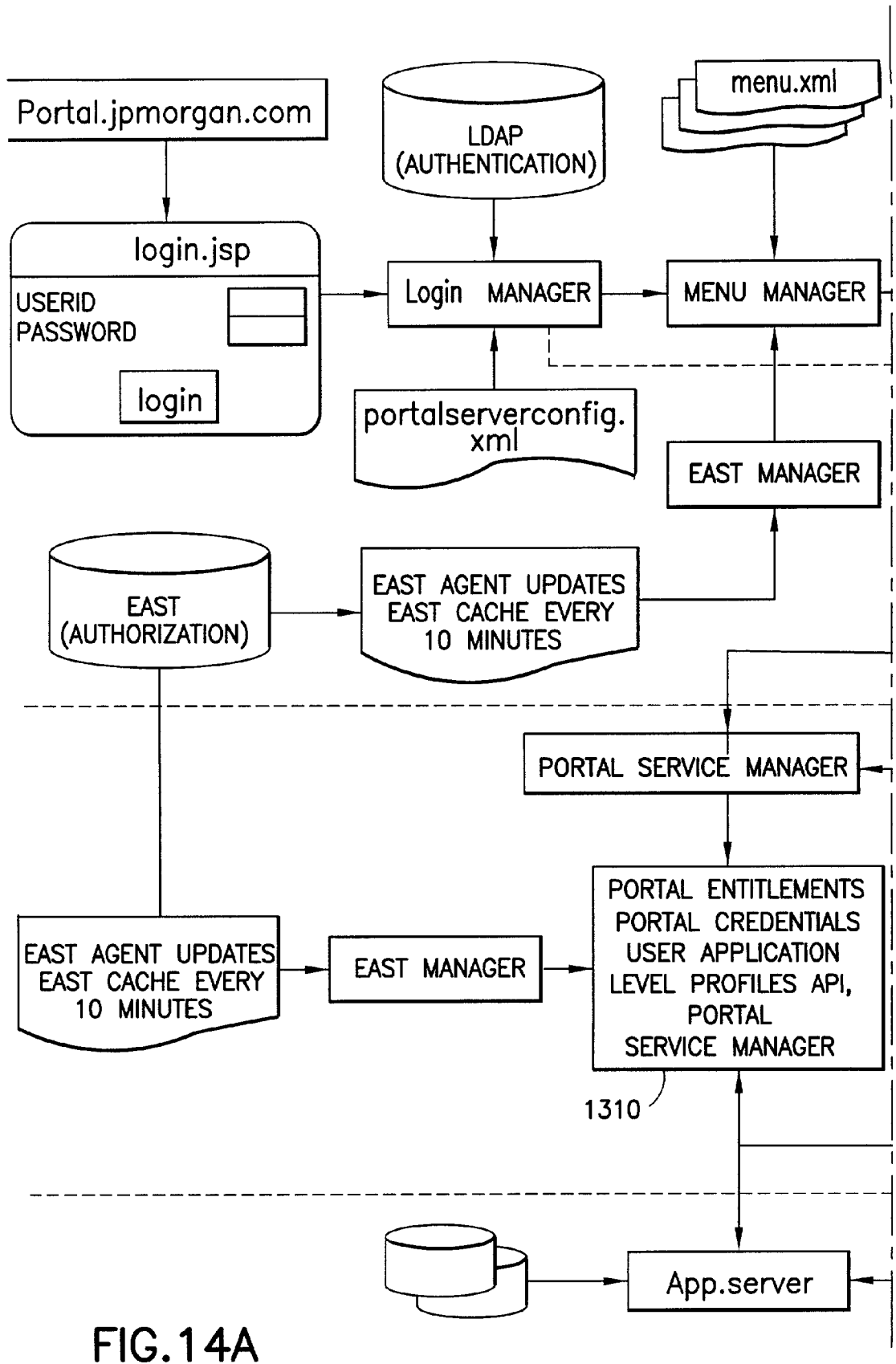
FIG. 14 illustrates interactions of various aspects of the invention.

The following is an overview and description of two major architectural components that encompass aspects of the invention. These two major architectural components (A-LAYER and PORTAL) are illustrated in FIGS. 13 and 14 and described below. As an example, the description below uses a trading environment. However, there is no requirement that the embodiments only apply in a trading environment. It should also be noted that although the various embodiments are described and illustrated in the context of an enterprise architecture, there is nothing that requires an enterprise architecture.

I. Architectural Layer ("A-LAYER") A-LAYER (1302) contains two main components: an Application Framework ("FRAMEWORK") (1304) and a Client API (1306).

A. FRAMEWORK The Application Framework (1304) is a group of ten services and standards (1308) to help develop applications that a user can launch from PORTAL. These services and standards are: (1) HTML Templates; (2) JavaScript Templates/Libraries; (3) Cascading Style Sheets; (4) Browser Notification Service; (5) Database Connection Manager; (6) LiteQuery Framework; (7) PDF Report Engine; (8) XML Configurator; (9) Cryptography; and (10) Exception & Logger Framework.

(1) HTML Templates Realizing that many applications will utilize the same types of screens (search, deal entry, blotter), a set of HTML templates are assembled. These templates contain all formatting and setup for standard screen types. This includes the use of JavaScript functions, Style Sheets as well as the general layout. By using the HTML templates, an application developer can maintain the same look and feel across applications.

(2) JavaScript Templates/Libraries JavaScript is used extensively throughout the applications that use PORTAL. In order to assist rapid application development and standardize re-usable code, a JavaScript Library is established containing a standard set of JavaScript Functions. The library includes, but is not limited to, functions that perform the following: (i) Layer creation; (ii) Launching Pop-Up Windows; (iii) Date formatting depending on location; (iv) Menu creation; (v) Form submission for hidden JSPs; (vi) Shortcuts for data entry; (vii) Rounding; (viii) List box for options; (ix) Row Selection; and (x) Auto-completion in entry fields using data sets in hidden JSPs. In order to assist in standardizing code layout, templates are also available for writing functions that are more specific to a given application.

(3) Cascading Style Sheets To standardize the look and feel for all applications that are launched through PORTAL, FRAMEWORK provides a common Cascading Style Sheet ("CSS") file that all applications can call. PORTAL implements the use of CSS 2.0. Examples of the types of tags that are included in the PORTAL CSS, include but are not limited to, tables, backgrounds, font sizes, and types, alternating rows, negative and positive numeric formatting and alignment.

(4) Database Connection Manager The A-LAYER connection manager is used by applications to connect to application databases. It uses the PORTAL framework to retrieve database specific user id's mapped to single sign-on user id. The Connection Manager queries the PORTAL user ID mapping Database to acquire database id's.

The A-LAYER connection manager is available for use in two forms. In situations where a specific database connection needs to be established under a specific user's name, a dedicated connection is associated to the user. The same connection is used for that user until the session expires.

The second form of A-LAYER connection manager supports a connection pooling methodology. The server creates a group of connections, which are available upon request. These connections are reusable among all authorized users. A typical example could be a reporting tool wherein the application does not demand specific database user id's to connect to the database.

The connection manager will automatically expire, or time-out, connections that have been unused for a specific period of time. The time limit is a configurable variable. It does this by starting up a "connection vulture" to periodically examine each connection that the connection manager monitors, and disconnect those connections that have been unused for a specified amount of time, or have been open for longer than the configured limit.

Where an application is not required to stamp a transaction or request with a specific user id for auditing purposes, the connection pooling method is recommended. One reason is that database connections are an expensive overhead and may result in reducing server performance.

(5) Browser Notification Service One objective of the Browser Notification Service is to use existing notification programs to keep viewed data on the client as up to date as possible. A second objective is to keep the implementation as simple as possible.

For each Sybase notification to be handled, the application server creates at least one Java bean. The bean registers itself with the Sybase notification server, specifying a callback method for the desired notification. When notified, the callback method retrieves the parameters passed by the Sybase notification server and, in turn, passes them to a stored procedure to fetch the updated data. The updated data is then stored in a vector in the bean along with a timestamp. This data remains alive in the vector for a period of time, such as five minutes. The vector is periodically examined inside a thread, such as every minute. Any data older than the specified time is deleted. (Note that Vector has synchronized methods.)

From the client, an applet in a hidden frame establishes a socket connection with a notifier object in the application server. This notifier object in the application server sends out a heartbeat every ten seconds in the form of a string message ("heartbeat"). When the viewed data changes, the notification bean in application server 104 informs the notifier object that it has received a change or update notification; this causes the notifier object in the application server to change ("refresh") the text of the heartbeat message. Client JavaScript continuously monitors the text of the heartbeat message. When the client JavaScript determines that the heartbeat message has changed, it triggers another hidden JSP within the client to call the application server to fetch the vector of notifications. Other client JavaScript functions then update the user's view of the data.

Three classes are implemented for Notification. They are a factory for creating a notification manager, the notification manager itself, and an abstract class that all notification beans should subclass from. Any application developer that wants to add a notification bean need only extend the abstract class and implement three methods. An application developer thus only needs to be concerned with the three methods that they have implemented.

(6) LiteQuery Framework

Background When implementing two-tier client-server systems using an object-oriented language (e.g., C++, Smalltalk or JAVA) for the client, and a relational database (e.g., Sybase or Oracle) for the server, a standard design issue is the conversion of relational data to objects (and vice-versa). The usual implementation uses a query to draw the data into the client whereupon the client can then process the result set. Each row of the result set becomes the set of values for initializing the instance variables of the newly created object.

After years of object-oriented development, this implementation has several well-known drawbacks. These drawbacks include: data traffic is typically heavy; the client requires a large amount of memory; and set up times can be long.

In designing the LiteQuery Framework it was noted that stored procedures in legacy databases return more data than the view (as in Model-View-Controller) typically requires. This in turn results in full-blown, "heavy" objects that quickly eat up client memory. Finally, as business grows from several hundred assets and counterparties to thousands, initializing thousands of asset and counterparty objects requires long set up times.

LiteQuery Basic Design The LiteQuery is designed to be used by multi-tier applications that employ HTML/JSPs, servlets, and application server and legacy database technologies. One design objective is to eliminate the three problems mentioned above. In one embodiment, the application server acts as a "client" to the legacy database server. It is recognized that the view, typically a trade entry screen or a search screen written as HTML/JSP, requires only two entities: a display string and a key.

Considering the case when a user enters a trade and the user selects an asset or counterparty. The typical user, when selecting an asset or counterparty, is only interested in the name of the asset or the counterparty. The view therefore requires only a display string. When saving the trade, the application requires a unique identifier for the asset or counterparty, typically the database primary key.

This is ideal for HTML/JSPs since the display string is what is presented to the user, and the key is the value that is passed to the servlet for processing.

Recognizing this, in one embodiment, A-LAYER implements a LiteQuery Framework. When queried, the LiteQuery Framework returns the display string and key. If more complete information is required for an asset or counterparty, the application server requests that data from the database using the primary key. This data is therefore drawn into the application only as needed.

LiteQuery Caching and Initialization The LiteQuery Basic Design that is described above significantly improves the memory requirements for assets and counterparties, and reduces the amount of data traffic. If, however, the LiteQuery Framework must go to the database each time the user requires a complete list of assets and counterparties, significant delays will be encountered. In other embodiments, the LiteQuery Framework solves this in two ways.

First, the data is cached in the application server's memory. When a user requests a set of assets or counterparties, the query is directed to the cache and not to the database.

Second, all asset and counterparty data is initialized into the cache during the application server startup. A special servlet, the LiteQueryManagementServlet, is created for this purpose. In the initialization (init( )) routine, which is called when the application server starts up, the cache is initialized. This loading process therefore never impacts the client user. When the Web server and application servers are available for client use, the cache has been initialized.

LiteQuery Cache Refresh During the period in which the application servers are up and running (which can be several days or weeks), assets or counterparties may be created or inactivated. Asset and counterparty data in cache therefore may become stale. To solve this problem, a thread is started at the time the application server is initialized that will refresh the cache. In one embodiment, this thread executes every ten minutes; this value is determined by a setting in a system configuration file (XML file). During this ten-minute period, it is possible that a user will not see a newly created counterparty or realize that a counterparty has been inactivated.

(7) PDF Report Engine The Report Engine uses the ITEXT (freeware) library as a base for creating both canned and slice and dice reports. The libraries are extended to include extra reusable functionality such as including functions for totals, truncations for numeric values as well as text values. The engine takes a data array, which is saved as a JAVA object that is returned from a stored procedure. It then uses the defined formatting and applies that to the data for presentation in a PDF file. PDF files are auto-launched from the browser and can be printed or saved from Adobe. This allows the users the ability to fax, store, or e-mail the report.

(8) XML Configurator The XML Configurator is a service that allows applications running off of PORTAL to configure their applications with information regarding where their database is located, where the application server is located, etc. Included in the Configurator are a number of JAVA classes that use the XML file to configure the application.

(9) Cryptography PORTAL offers an RSA library tailored for PORTAL applications, which allows an application developer to use 128-BIT encryption to store data. The types of data that this can be used for are the encryption of session information, and user id's that are stored in memory. This service provides a greater level of security to which only the PORTAL Cryptography Service maintains the encryption key.

(10) Exception & Logger Framework The Exception & Logger Framework provides the service of allowing a PORTAL application to store exceptions and logs in daily file sets as opposed to being overwritten on a daily basis. It is configurable to allow an application developer to decide the length of time these files will be kept before being overwritten, or discarded. It provides the application developer with the ability to archive exceptions over a longer period of time.

The Exception & Logger Framework also provides the ability to store audit and transactional history. By using the provided classes and methods, an application developer can keep track of critical events within an application as audit user specific transactions.

Certain processes or queries run as an application, as opposed to by a particular user. For these types of transactions most applications have a generic read only id that can connect to the database. PORTAL also maintains these accounts within PORTAL.

B. Client API The Client API (1306) provides an interface for PORTAL Credentials, PORTAL Entitlements, User application level profiles API, and the PORTAL Service Manager (1310).

(1) PORTAL Credentials The Client API provides client Applications with the ability to pass a user's token to the API and receive back the credentials for that user as described below in Maintaining Persistent User Credentials.

(2) PORTAL Entitlements The Client API provides client applications with the ability to query user entitlements from EAST. EAST is a security framework built on IBM Policy Director and LDAP. EAST also provides information regarding PORTAL entitlements to the client applications.

(3) User application level profiles API The API for application level profiles allows an application to access user profile information saved with PORTAL. User profiles include the saving of different profiles per screen of displayed data.

(4) PORTAL Service Manager The PORTAL Service Manager is an application administrator's console that is launched from within PORTAL. The console allows an application developer or administrator to: (i) Reload their XML application configuration files; (ii) Notify and request automated upload of a new menu XML file by PORTAL; (iii) View user level entitlements to troubleshoot if users were set up correctly in the system; (iv) Check Application entitlements against EAST; (v) Check stored session information; (vi) Check to see the number of active users; and (vii) Check to see the number of users logged in but not actively using the application.

II. Web-based Applications Portal ("PORTAL") PORTAL offers eight services (1322) that can be used by application developers to manage and deploy their applications. These services are: (1) Single Sign-On; (2) Authentication; (3) Authorization; (4) Query Entitlements; (5) User Profiles; (6) Mapping of User Ids to legacy systems; (7) Maintain Persistent User Credentials; and (8) Application Security.

(1) Single Sign-On (SSO) SSO is a security framework, which allows an application developer to add authentication (determining the identity of a user) and authorization (what is the user allowed to access) to any web based application. The concept of the single sign-on is to map several application user id's and passwords to one PORTAL user id and password. For this reason, the first time that a user signs-on to PORTAL, when they attempt to access an application, they will have to enter that application's user id and password. On following attempts, once they have signed-in to PORTAL, they will automatically have access to the other applications that they use.

In addition, the SSO framework uses an entitlements-based approach to security. Entitlements get assigned to groups of users. Entitlements also get assigned to resources, for example JSP pages or a component of an application.

(2) Authentication Authentication is the process of uniquely identifying a user. PORTAL receives the user's credentials (evidence of identity by supplying a user id and password), validates the credentials, and returns a distinguishing unique identifier for the user (stored in the user's session information). In one embodiment, Lightweight Directory Access Protocol ("LDAP") is used for authentication. A set of rules is defined which guides the limits on user authentication attempts, and storing of user id and passwords.

(3) Authorization/Entitlements Authorization allows a user with a defined role to access a given resource (page, user defined or application component). PORTAL uses EAST entitlements to carry out authorization. Once an application has registered it's entitlements in EAST, the application queries the PORTAL client API, and entitlement information is returned.

(4) User Profiles Because some client applications do not store any information in their legacy databases, and only make queries against the databases, PORTAL provides the ability to store user profile information in a centralized PORTAL database. Each profile is stored as a single binary record per user profile. Applications can call these profiles through the Client API layer in A-LAYER. A common JSP tag is provided though the FRAMEWORK component in A-LAYER, such that all profile management screens are the same regardless of which application is being accessed.

(5) Mapping of User Ids to Legacy Systems By providing the single sign-on ability, PORTAL also provides a database in which to store encrypted pairs of user id's and passwords for each user. Each user id and password that is stored in the database is encrypted using 128 bit-encryption using a key generated by EAST and Security Access.

(6) User Credential Persistence When a user signs-in to PORTAL, EAST returns an EAST object, which is used to check user entitlements. This EAST object is stored in a PORTAL token and passed to the browser with the following information: PORTAL ID, Session expiry time is configurable through XML, and the user's IP address. When a user first attempts to access a client application in PORTAL, the application gets the token from the user's browser with the request. The application uses this token to make a request to the PORTAL API for a credential for that user.

(7) Application Security There are certain processes or queries that are run as an application as opposed to by a particular user. For these types of transactions, most applications have a generic read only id that can connect to the database. PORTAL also maintains these accounts within PORTAL.

The two major architectural components (PORTAL & A-LAYER) are designed such that a developer deploying an application through PORTAL does not require the FRAMEWORK component of A-LAYER. Instead, they can use the Client API component of A-LAYER, and connect directly to PORTAL.

Having described the various embodiments of the invention in somewhat general detail in the context of an enterprise, a more detailed description of particular aspects of the invention is provided below.

Figure 2B:
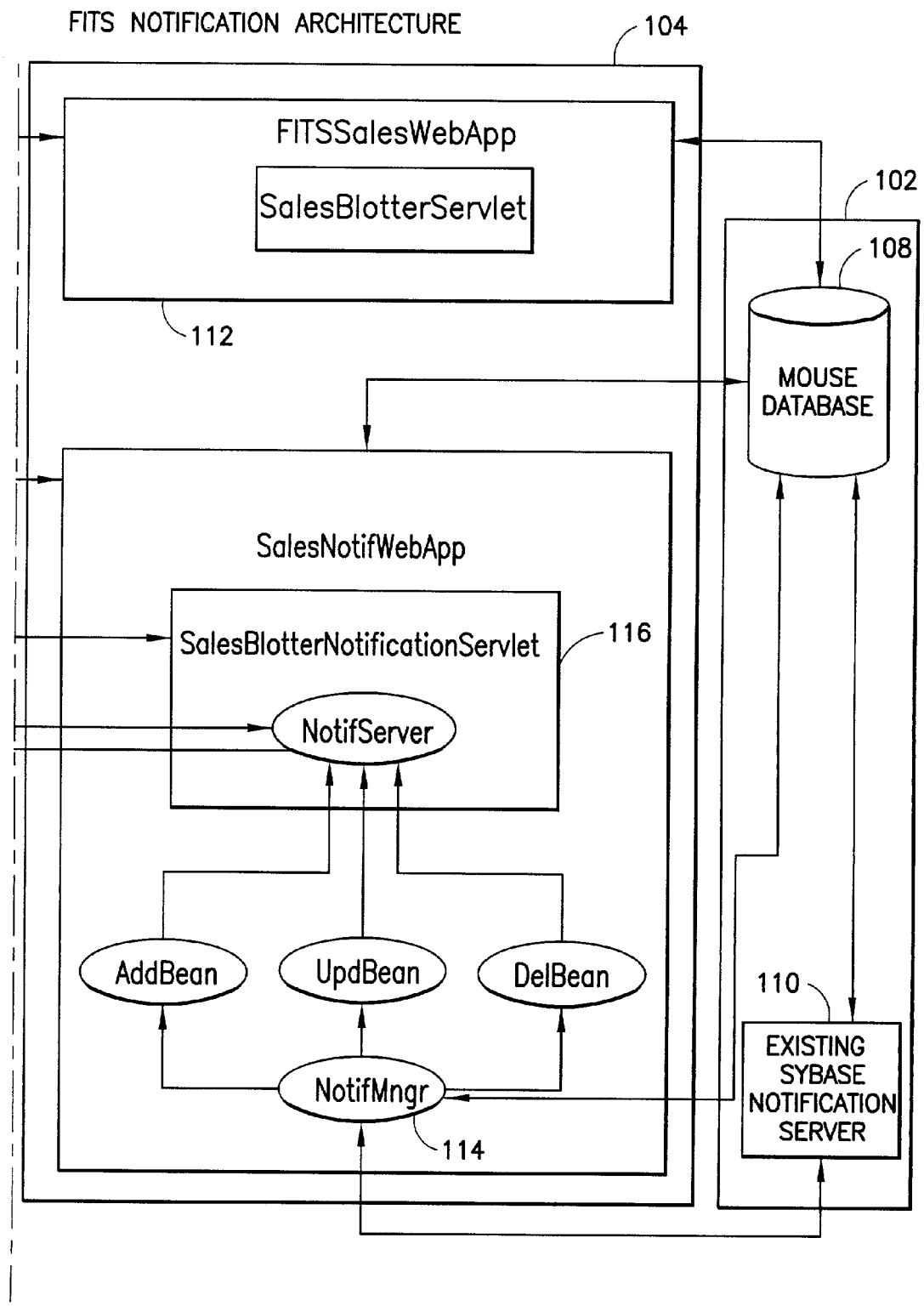
FIG. 2 illustrates interactions of elements of a system according to one embodiment of the invention.

Referring to FIGS. 1, 2 and 3, during startup of system 100, Sybase server 102 and application server 104 perform various initialization steps. Many of these steps are not relevant to the invention, but some steps do have relevance to the invention and those steps are described below.

At step 302, Sybase server 102 initializes the Sybase database 108.

At step 304, Sybase server 102 starts the notification server 110.

At this point, the Sybase server is ready for connections from application server 104.

At step 306, application server 104 loads applications 112 and 116.

At step 308, application server 104 determines the data elements that should be included in the initial LiteQuery cache.

At steps 310, 312, application server 104 and Sybase server 102 establish a connection.

At steps 314, 316, the initial data elements for the LiteQuery cache are pulled from Sybase server 102 to the LiteQuery cache of application server 104. It is also possible that instead of being pulled, the data elements are sent from Sybase server 102 to application server 104.

In one embodiment, upon start-up of the application server, only three caches are started. The caches are for assets, non-emerging market assets and counterparties. All other caches, such as countries and currencies are lazily initialized. Lazy initialize means that the cache is not initialized until a client requests information that would be in the cache. This is illustrated generally in FIG. 5. The types of data held by the LiteQuery caches are typically relatively static elements. For example, caches may be created for parties, counterparties, and currencies. Because the data is relatively static, moment by moment synchronization between the LiteQuery cache and the underlying Sybase database is not essential. However, if the data elements in the cache are not updated or refreshed on a somewhat regular basis, the cache will become stale. For this reason, the application server runs a timer to periodically request and update or refresh the data elements in the cache from the Sybase server. In one embodiment, this timer/refresh cycle is a LiteQuery cache manager. This manager thread runs every 10 minutes and different caches may have different refresh cycles, some as frequently as every 10 minutes and others less frequently, such as only once a day. Each time the manager thread runs, it checks to see if any of the cache refresh cycles are due. In one embodiment, upon each refresh cycle, the entire cache is refreshed. In another embodiment, only changes to the cache are made, and the entire cache is not refreshed. Some of these aspects are not illustrated in the figures. The concept of refreshing an existing cache is different from initializing or creating a cache.

It is also possible for the cache update or refresh to be handled in a manner similar to browser notification, described elsewhere, where the cache is updated when the Sybase notification server sends a notice of update, and a cache bean monitors the Sybase notification server.

The LiteQuery cache does not include all of the elements associated with a data record type stored in the Sybase server. As an example, the data record for a particular trading party that is maintained within the Sybase server is likely to include a significant amount of information. Much of that information is needed by a client on a very infrequent basis, but the user needs some information, such as the party name for trades involving that party. Therefore, in one embodiment, the cache includes a limited subset of the full data record held by the Sybase server. The minimum information contained within the LiteQuery cache is a record ID and a string variable. The term LiteQuery cache therefore comes from the concept of using a thin cache that does not include all of the elements in the data record. The string variable and record ID from the LiteQuery cache are both passed to the client browser. The string variable is displayed to the client user. The record ID is held by the browser and allows the application server and Sybase server to locate or retrieve additional information on that particular ID when or if the client user requests it. In this manner, the amount of information exchanged between the application server and the client browser is reduced. Details of this aspect of the invention are described elsewhere in greater detail.

At steps 318, 320, notification manager 114 of application server 104 and notification server 110 of Sybase server 102 establish a connection. Once the connection is made, notification manager 114 of application server 104 registers with notification server 110 of Sybase server 102 for the required notifications. In one embodiment of the invention, the notifications are for dynamic types of data, such as deals with notifications for deal add, deal delete, and deal update. In other embodiments of the invention, the notifications include other data types. Some notifications include static data types, such as parties, counterparties, countries, and currencies with notification of add, delete and update of these data types.

At step 322, notification manager 114 of application server 104 starts three Java beans. These beans are an add bean, a delete bean and an update bean.

At step 324, application server 104 determines whether any client browsers 106 are connected to application server 104 and have requested notification. If no client browsers are connected or request notification, application server 104 loops or waits until there is a connection by a client browser or change notification.

At step 326, notification manager 114 of application server 104 transmits or broadcasts the heartbeat message to client browser 106. This transmission is over a TCP socket connection and is described in greater detail below.

As long as a TCP socket connection exists between the application server and at least one client browser 106, the heartbeat message will be broadcast to all active client browsers 106 that have a TCP socket connection. When a client browser times out or terminates their session, the TCP socket connection is lost and that client browser is removed from the list of active clients.

At step 328, notification manager 114 of application server 104 waits for a notification from Sybase notification server 110 of Sybase server 102. The notification that notification manager 114 waits for at step 328 is one of the notifications registered at steps 318, 320.

Once application server 104 and Sybase server 102 are initialized, as illustrated in FIG. 3, and described above. A client browser 106 can connect to application server 104.

Figure 4B:
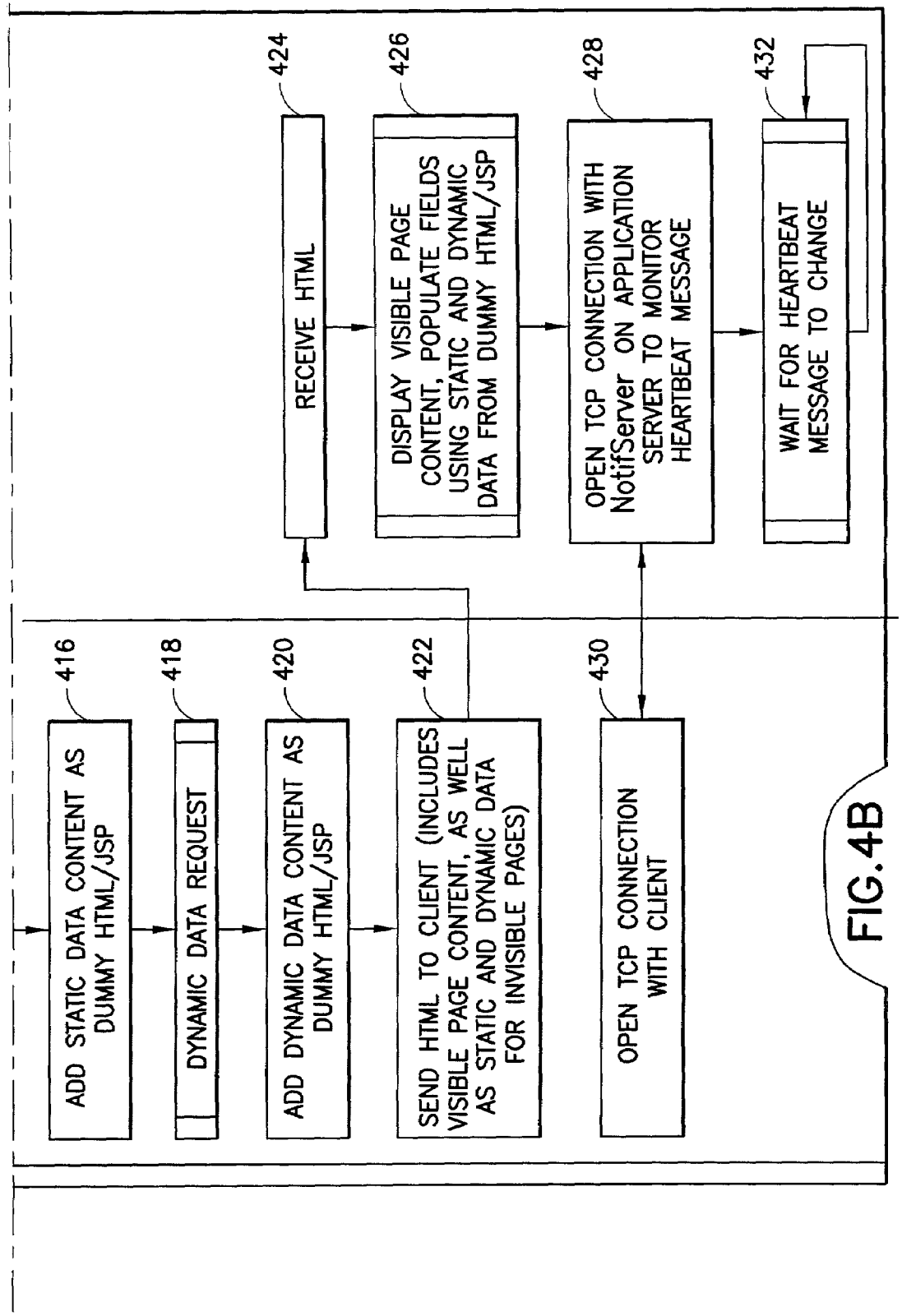
FIG. 4 illustrates steps in a method according to one embodiment of the invention.

Referring now to FIGS. 1, 2 and 4, at step 402, application server 104 is initialized and running, with the notification manager 114 generating heartbeat messages.

At step 404, client 106 loads and starts a browser application. In one embodiment, the browser is INTERNET EXPLORER, by Microsoft Corp. of Redmond Wash. In another embodiment the browser is NETSCAPE, by Netscape Communications Corp. of Mountain View, Calif. Other browsers are known and appropriate for the invention.

At step 406, the user of client browser 106 logs in to the requested application server 104 and obtains browser session credentials. In one embodiment the log-in is for a single session sign-on, and the browser session credential is used with multiple applications, without the need for the user to log-in again.

At step 408, client browser 106 requests a specific application resource from application server 104 via http.

At step 410, application server 104 receives the request for a resource, and begins to generate a response to the request.

At step 412, application server 104 generates content for the visible portion of the web page response, and adds this portion to the HTML response. The visible portion may include multiple layers, some of which are displayed in front of other layers. The browser moves various layers to the front for visibility or toward the back to make another layer visible.

Figure 5:
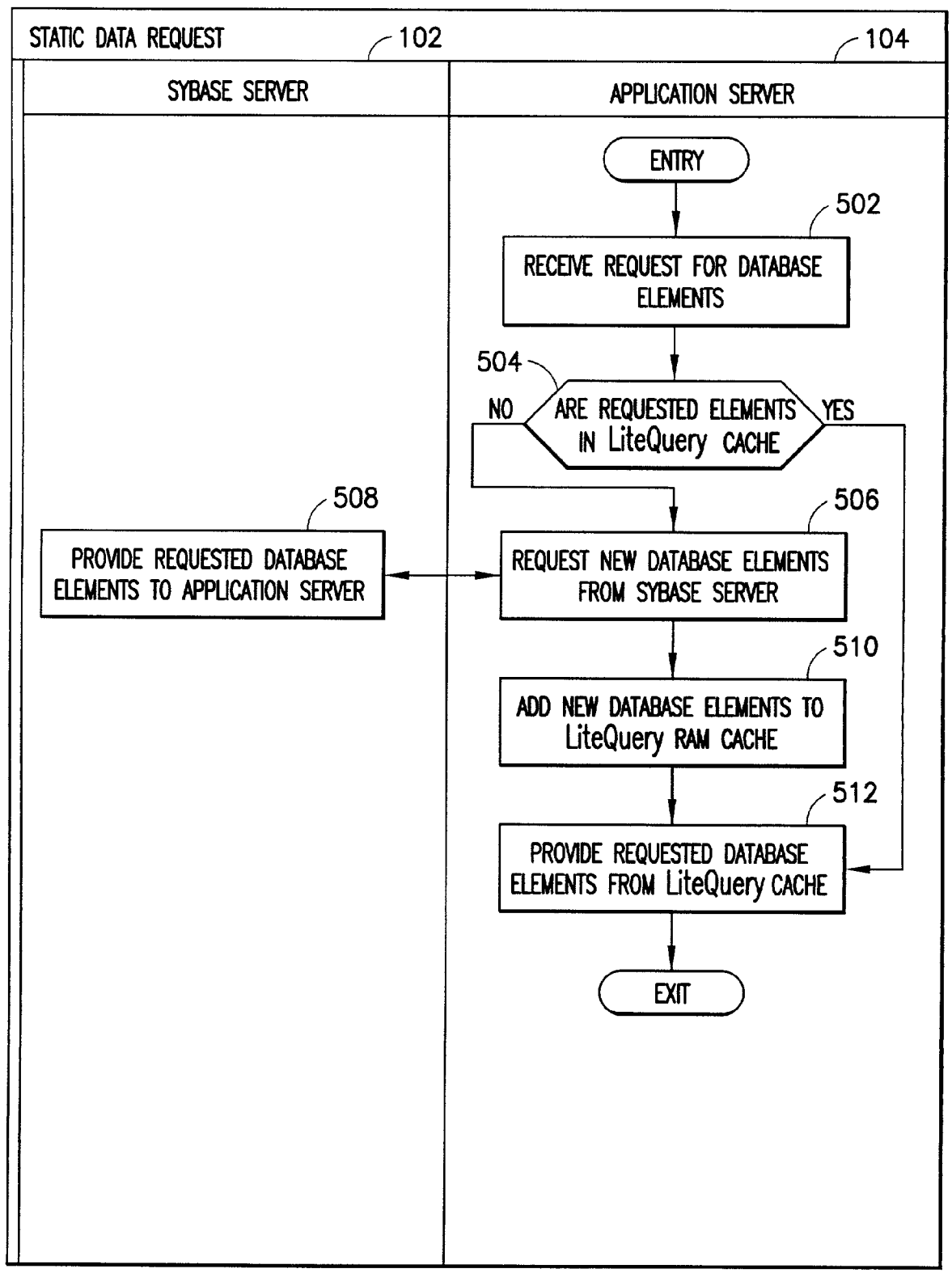
FIG. 5 illustrates steps in a method according to one embodiment of the invention.

At step 414, application server 104 makes a request for static data. This request may include multiple steps, which are illustrated in FIG. 5 and described more fully below.

At step 416, application server 104 adds the static data content to the HTML response as dummy HTML/JSP. This static data will be included in an invisible frame (204 of FIG. 2).

Figure 6:
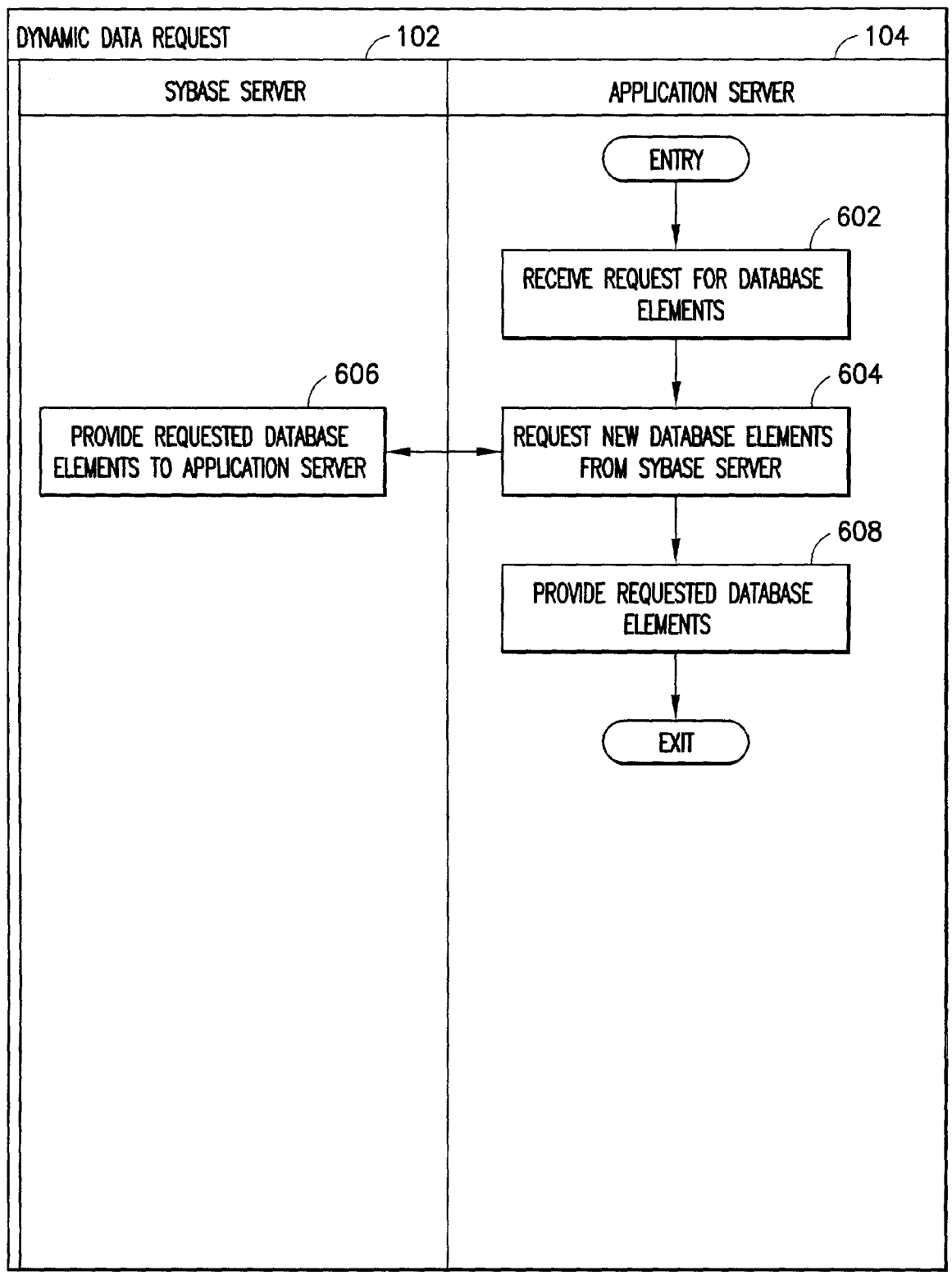
FIG. 6 illustrates steps in a method according to one embodiment of the invention.

At step 418, application server 104 makes a request for dynamic data. This request may include multiple steps, which are illustrated in FIG. 6 and described more fully below.

At step 420, application server 104 adds the dynamic data content to the HTML response as dummy HTML/JSP. This dynamic data will be included in an invisible frame (202 of FIG. 2).

At steps 422, 424, application server 104 sends the HTML response to client browser 106. The HTML includes the visible content (including multiple layers) (206 of FIG. 2), and dummy HTML/JSP for invisible frames (202 and 204 of FIG. 2).

Figure 7:
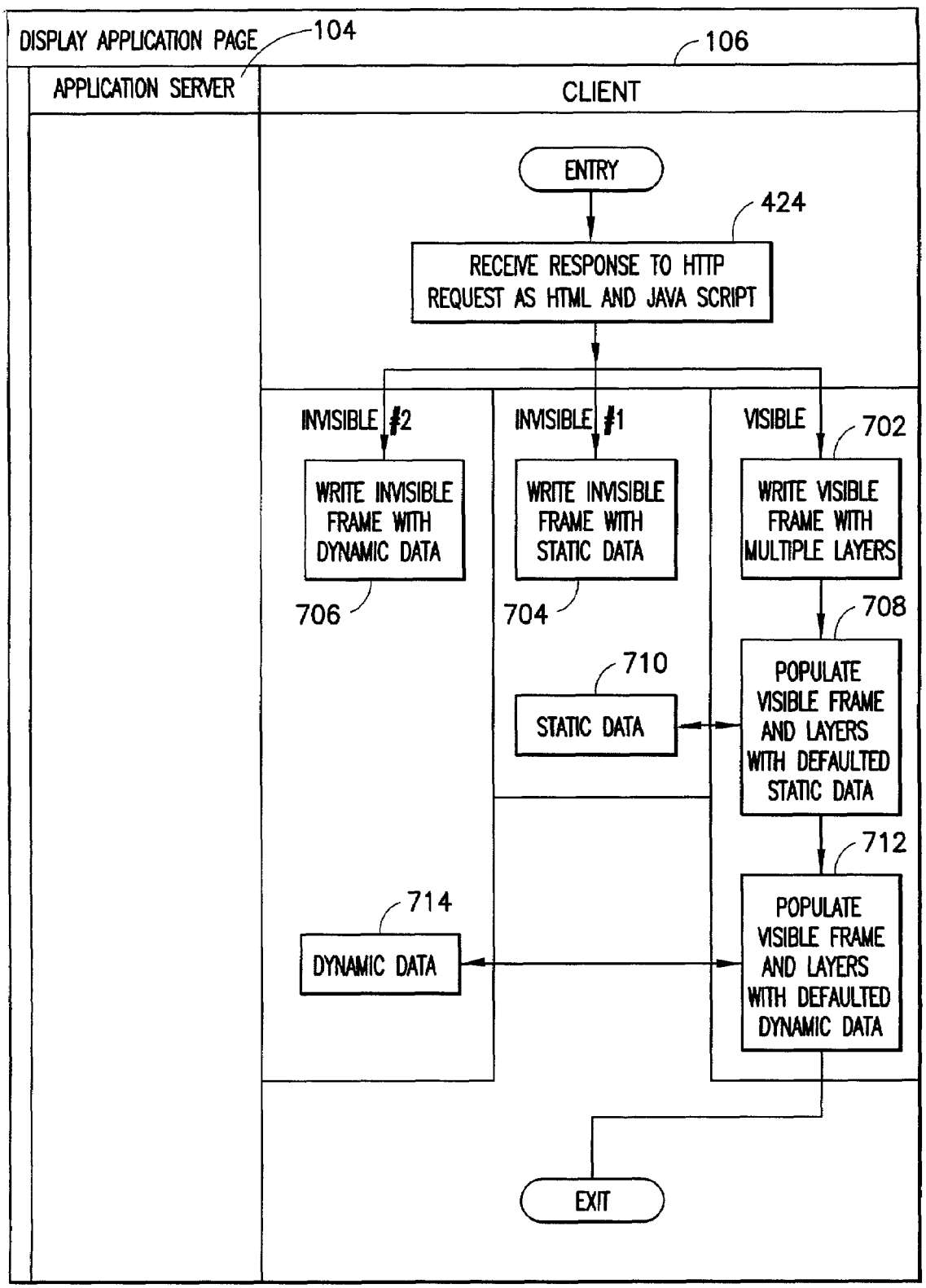
FIG. 7 illustrates steps in a method according to one embodiment of the invention.

At step 426, client browser 106 reads the HTML of the response and renders the layers of the visible page content (206 of FIG. 2), as well as the invisible frames with static (204 of FIG. 2) and dynamic (202 of FIG. 2) data. Step 426, displaying the page, may include multiple steps, which are illustrated in FIG. 7 and described more fully below.

Once client browser 106 renders the initial web page at step 426, then at steps 428, 430, client browser 106 opens a TCP socket connection with the notification server 116 of application server 104. One purpose of this TCP connection is to provide a path for the heartbeat message.

Figure 11B:
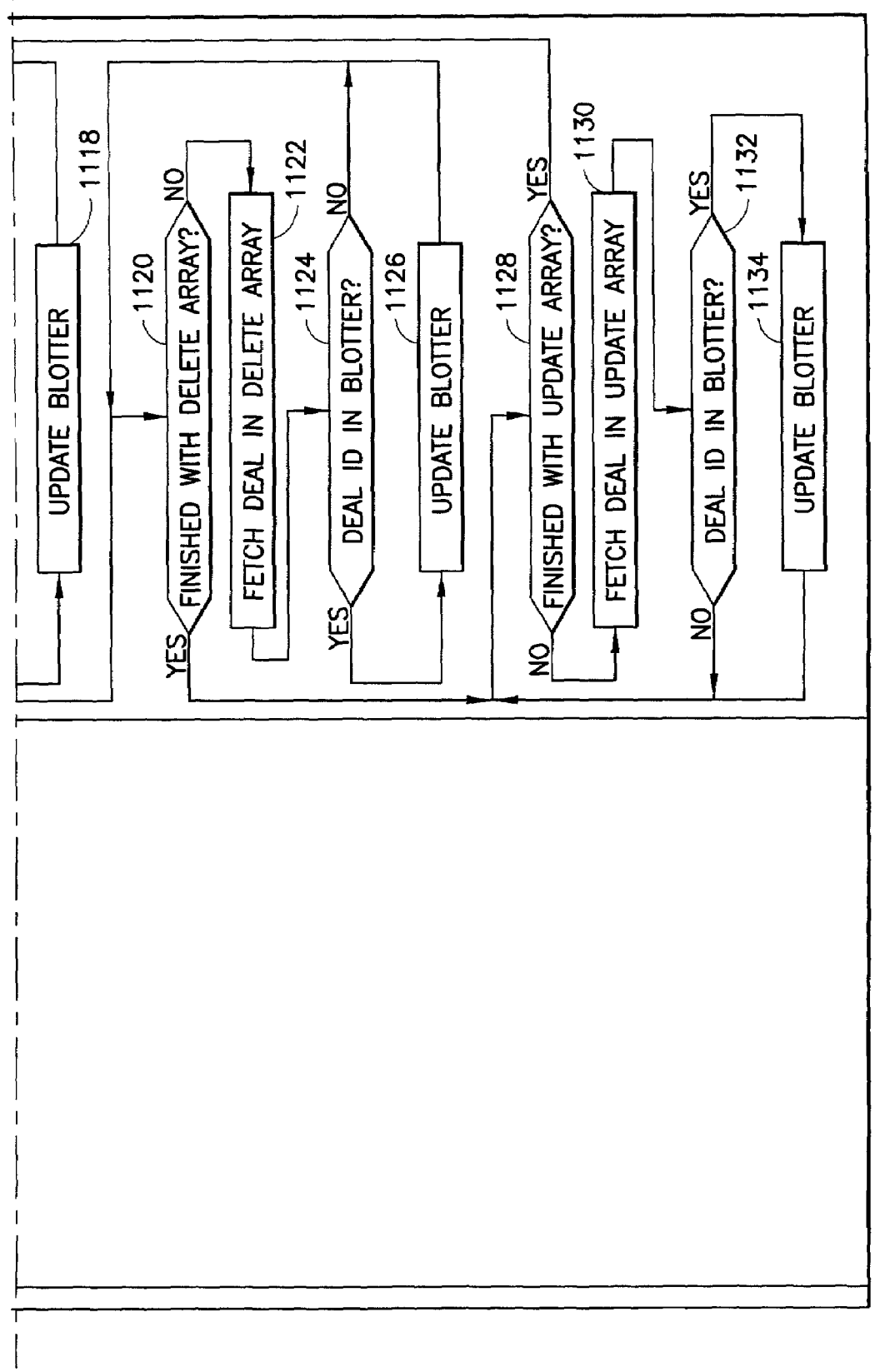
FIG. 11 illustrates steps in a method according to one embodiment of the invention.

At step 430, client browser 106 monitors or waits for changes in the heartbeat message. Waiting for changes in the heartbeat message may include multiple steps, some of which are illustrated in FIG. 11 and described more fully below.

Referring now to FIG. 5, the request for static data at step 414 of FIG. 4 begins at step 502 with a request to application server 104 for database elements.

At step 504, application server 104 determines whether the requested database elements are present in the LiteQuery cache.

If the requested database elements are present in the LiteQuery cache, then at step 512, application server 104 provides the requested database elements from the Lite-Query cache.

If the requested database elements are not present, then at steps 506, 508, application server 104 requests the static database elements from Sybase server 102. This part of the lazy initialization is described elsewhere.

At step 510, application server 104 adds the static database elements to the LiteQuery random access memory (RAM) cache.

At step 512, application server 104 provides the requested database elements from the LiteQuery cache.

Although the LiteQuery cache is a thin cache, it will generally include more data records than any particular client browser will use. This is because the profile of a particular user will limit the trades and deals that user has access to. For this reason, the client browser will only see some of the records held by the LiteQuery cache.

Additionally, the user of client browser 106 is normally interested in a small quantity of information from an entire data record. For example, the data record held by Sybase database 108 for a party or counterparty may include their address information, in addition to many other fields. The user of client browser 106 is likely only interested in the name of the party or counterparty. Therefore, the information held by the LiteQuery cache and sent to the client browser includes only the string variable for the name, and a record ID. The party or counterparty name is displayed to the user of client browser 106, and the record ID is kept and used to uniquely identify that particular party or counterparty. The record ID allows the browser and application server to get additional information on the party or counterparty from Sybase database 108. The record ID also allows the information in a trade commit to uniquely identify the party or counterparty.

Referring now to FIG. 6, the request for dynamic data at step 418 of FIG. 4 begins at step 602 with a request to application server 104 for database elements.

Dynamic data is generally not stored in the LiteQuery cache, so at steps 604, 606, application server 104 requests the dynamic database elements from Sybase database 108 of Sybase server 102.

At step 608, application server 104 provides the requested dynamic database elements.

Referring now to FIG. 7, rendering the application screen at step 426 of FIG. 4 begins with client browser 106 writing a visible frame, including multiple layers (206 of FIG. 2); an invisible frame with static data (204 of FIG. 2); and an invisible frame with dynamic data (202 of FIG. 2) at steps 702, 704, 706 respectively.

Use of an invisible frame and applet (202 of FIG. 2) provides certain advantages. One advantage is that no plug-in or swing components are required, and there are no display widgets. The applet is responsible for maintaining the TCP socket connection. Javascript monitors the instance variable to determine whether the heartbeat message has changed from "heartbeat" to "refresh."

At steps 708, 710, the visible frame populates the fields in the various layers that require static information using the default static information that is contained within that respective invisible frame (204 of FIG. 2).

At steps 712, 714, the visible frame populates the fields in the various layers that require dynamic information using the default dynamic information that is contained within that respective invisible frame (202 of FIG. 2).

As illustrated in FIG. 4, upon initial client connection, client browser 106 waits for the heartbeat message to change at step 430 after opening the TCP connection at steps 428, 430.

Figure 8:
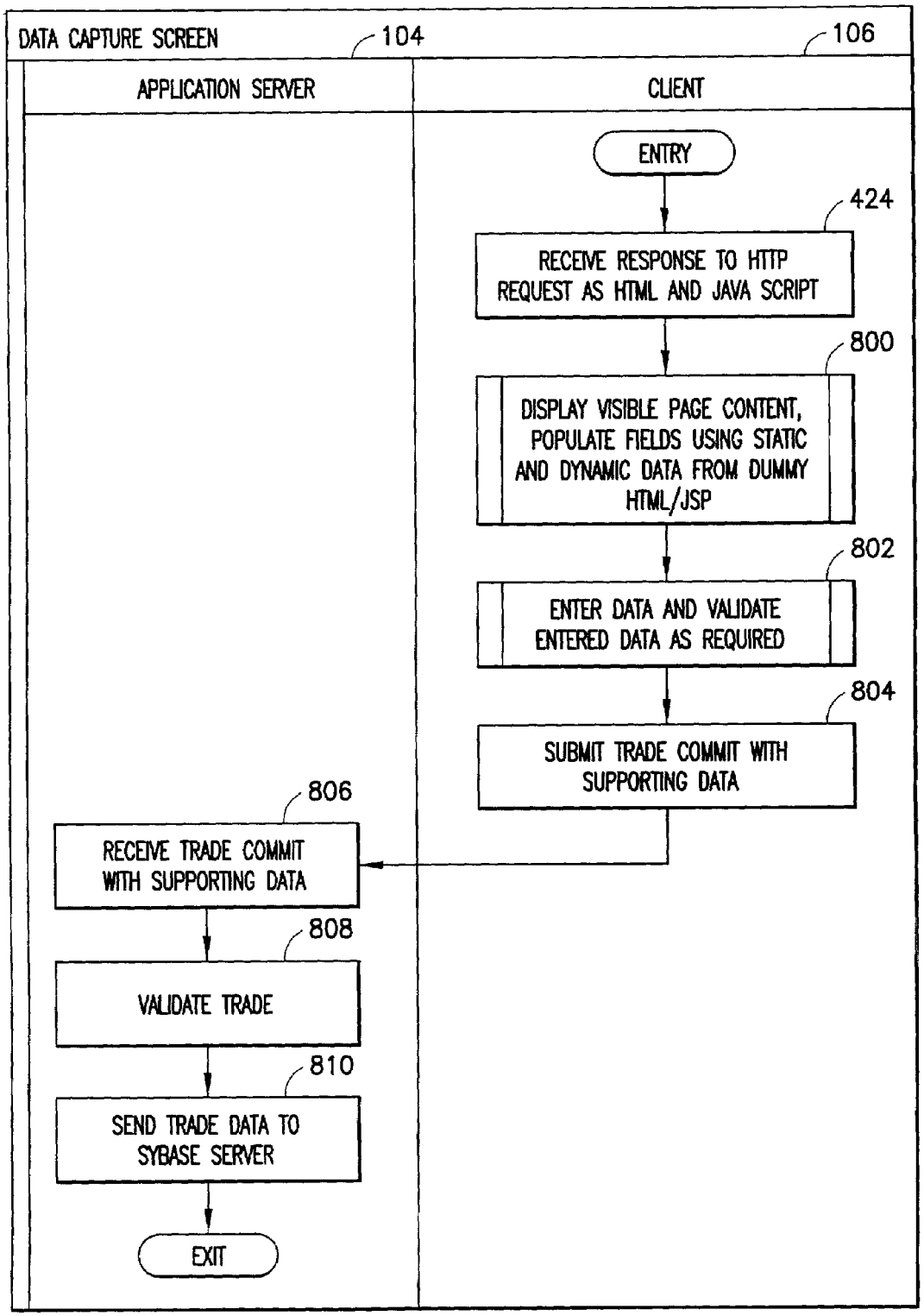
FIG. 8 illustrates steps in a method according to one embodiment of the invention.
Figure 9:
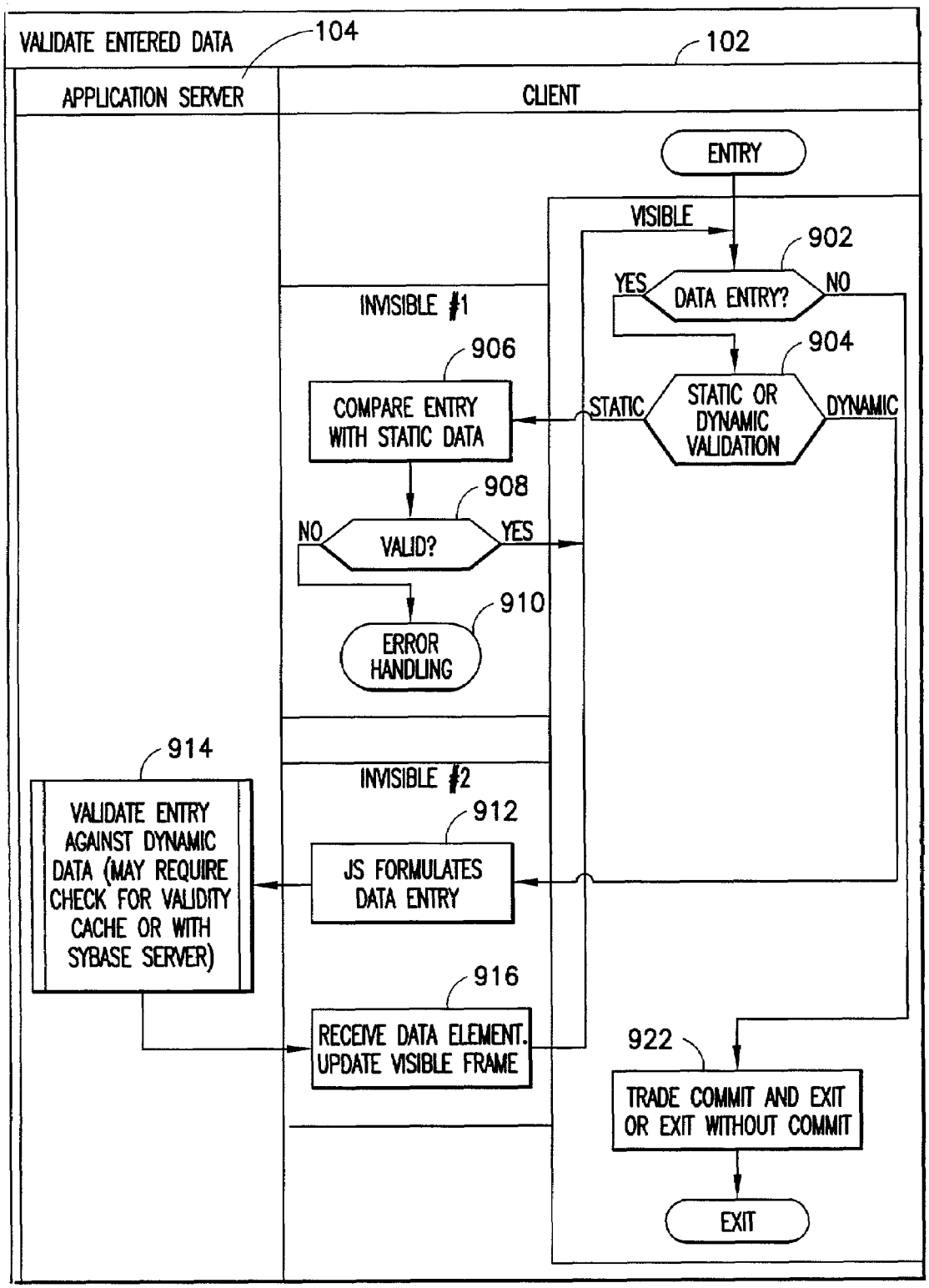
FIG. 9 illustrates steps in a method according to one embodiment of the invention.

Referring now to FIG. 8 in most operations, shortly after client browser 106 renders the display page (step 800), the user will begin to request further information and make trades using that information. At step 802, when the user enters or selects data on the display screen, some of the information is validated. Step 802 includes multiple steps, some of which are illustrated in FIG. 9.

At step 804, the user of client browser 106 submits a trade commit, which includes supporting data.

At step 806, application server 104 receives the trade commit with supporting data, and at step 808, validates the trade.

At step 810, application server 104 sends the trade data to Sybase server 102, where it is stored.

Referring now to FIG. 9, the steps for validation of data at step 802 of FIG. 8 are more fully described.

At step 902, client browser 106 determines whether the action is a data entry, as compared to a trade commit or exit without commit.

If the action is data entry, then at step 904, client browser 106 determines whether the entry requires validation against static data that is held by the respective invisible frame (204 of FIG. 2), or validation against dynamic data that is available through the respective invisible frame (202 of FIG. 2).

Figure 12:
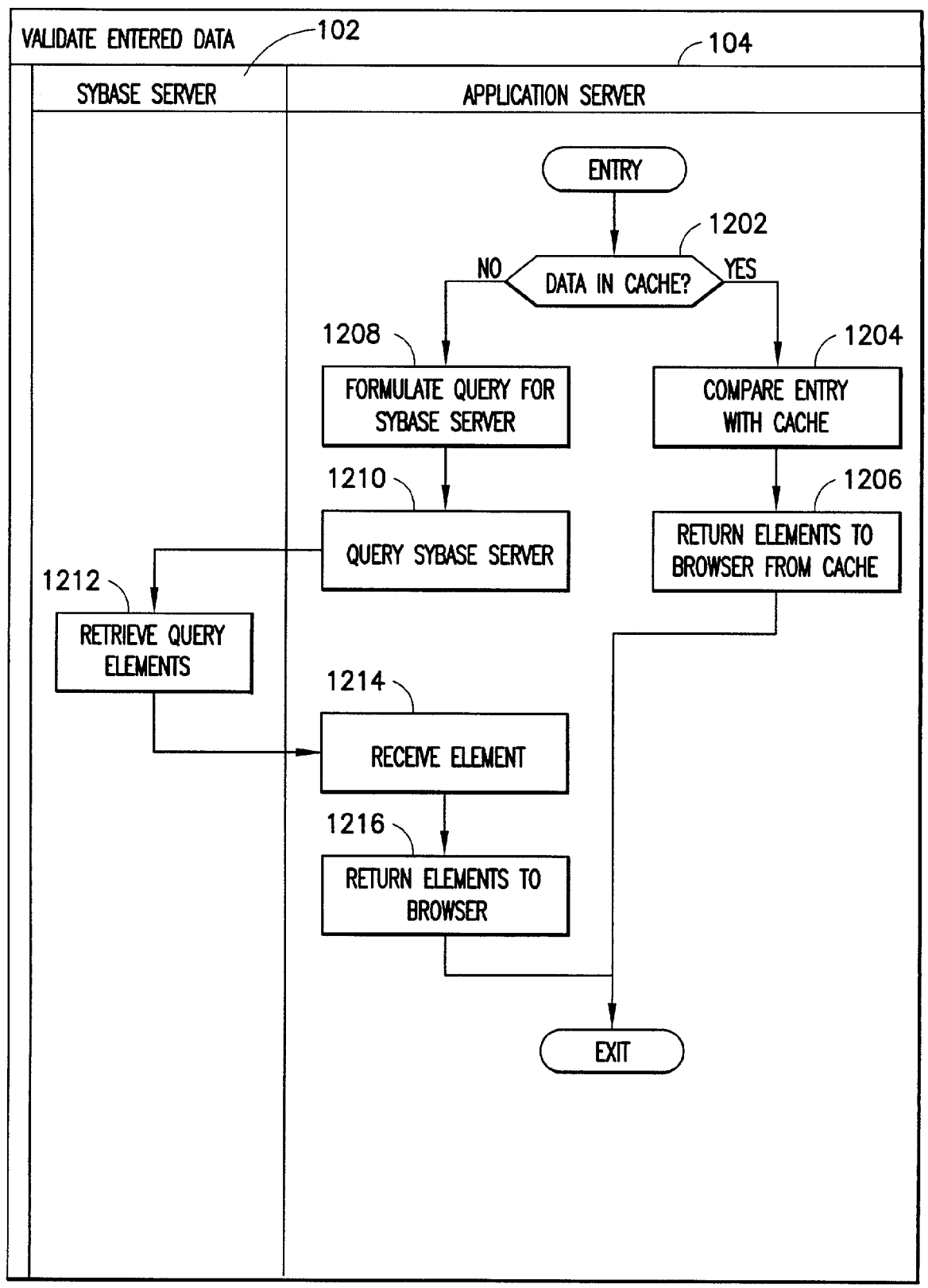
FIG. 12 illustrates steps in a method according to one embodiment of the invention.

If static data, then at steps 906, 908, the data entry is compared or validated against static data. If the data entry is not valid, then at step 910, the user of client browser 106 is given an opportunity to correct the data entry and update the visible frame. The validation performed at step 914 includes multiple steps, which are illustrated in FIG. 12.

If at step 904, client browser 106 determines that the data entry requires validation against dynamic data, then at step 912, client browser 106 determines whether the data entry requires validation against dynamic data that is held by the respective invisible frame (202 of FIG. 2) or validation against data available from application Server 104. Then at steps 914, 916, client browser 106 and application server 104 validate the entry and update the visible frame. The validation performed at step 914 includes multiple steps, which are illustrated in FIG. 12.

In addition to validation of dynamic data, it is possible to use the connection from the client to the application server and potentially to the Sybase server to assist with data selection. As an example, the user wants to select an asset and knows that the asset name begin with the letter B. When they enter the letter B into the field for asset and then press the enter key or tab out, javascript within the browser creates a query and passes that query to the application server with instructions to search the LiteQuery asset cache for all assets beginning with the letter B. For ease of description, this query is called a Memory filter LiteQuery. The application server is able to determine whether sufficient information is present within the LiteQuery asset cache to conduct the search, and if not formulates the search to access the Sybase database. The search result, which consists of all assets that begin with the letter B is then returned to the client browser and that set of assets that begin with the letter B is used to populate a pickbox on a layer of the visible frame of the browser.

In this way, the client browser 106 formulates a search and sends that search to the application server 104. The client browser 106 does not need to know how to conduct the search, only that the search is in assets and what the criteria is. The application server 104 knows how to conduct the search of the LiteQuery asset cache and also knows whether the type of information will be found in the Lite-Query asset cache, or whether the type of information must be found in Sybase database 108.

Another variation of validation is where data in two fields are related by a dynamic value. An example is where the denomination for a particular type of trade is in Argentine pesos, and another field on the trade blotter indicates the face amount in U.S. dollars. When the user enters the quantity in Argentine pesos, the javascript in the client browser 106 goes out to the application server 104, which may go to the Sybase server 102 if necessary, to retrieve the current FX rate. That rate is returned to the client 106 and the javascript uses that rate to calculate the face amount in U.S. dollars and then display that amount in the respective field of the trade blotter.

At step 922, client browser 106 determines whether the action is a trade commit and exit, or exit without commit.

In the steps illustrated in FIG. 9, the steps are described as checking for validity of entered data. However, it is equally likely that instead of the user merely entering raw data that is then validated, the user is presented with choices for data selection. These various embodiments are described in greater detail below.

For example, in one data field, the user may be provided with a list box of countries. The countries are part of the static data that is stored in the respective invisible frame (204 of FIG. 2). That list of countries is used to populate the list box. Therefore, rather than "validate" the user entry of a particular country, the user is provided with a list box of valid countries to choose from. As long as the user's selection of a country comes from that list box, the entry will be valid. Therefore, in this embodiment, the range of possible data that might be entered is "validated" before the user selects it.

In another example, the range of possible security instruments is static data that is held within the respective invisible frame (204 of FIG. 2). The number of possible security instruments may be very large and use of a list box to display all of the instruments is not an ideal way to present the information. Therefore, the user of client browser 106 is provided with a blank data entry field, and as soon as they begin to type or enter data into the field, the possible security instruments that will match the data entry begins to narrow. As the user enters each character, the range of matching instruments is reduced until only one possible match is left, which the user selects. Alternatively, as the user enters characters, they are left with a smaller list of possible matching instruments, from which they select the desired instrument. This technique is different from the traditional list box technique of most existing browsers.

With the list box of existing client browsers, when the user types the first letter, the list box scrolls immediately to the first item in the list box that matches that letter. In order for the user to scroll down in the list box, they must either continue to enter the same letter or use the scroll bar. For example if the user wants to select the state of New York. The user enters the letter N, and the list box jumps/scrolls to Nebraska, which is the first state in an alphabetized list of states. As the user continues to press N, the list box scrolls one state each time. (i.e., Nevada, New Hampshire, New Jersey, New Mexico, and finally New York). If the user does not continue to enter the same first letter (e.g., N), but instead enters the next letter in the name (e.g., E for the second letter of New) they are not taken to a state that has the first letters NE, but will be taken to Florida, the first state in the list box after E, certainly not what they wanted.

The validation described above involved checking entered data against static and dynamic data. Although not illustrated, the invention also uses other validation techniques, such as restricting data entry for certain fields to only certain types of data (e.g., numbers for amounts and allowable date format for dates). Many of these validation checks are performed with javascript.

Figure 10B:
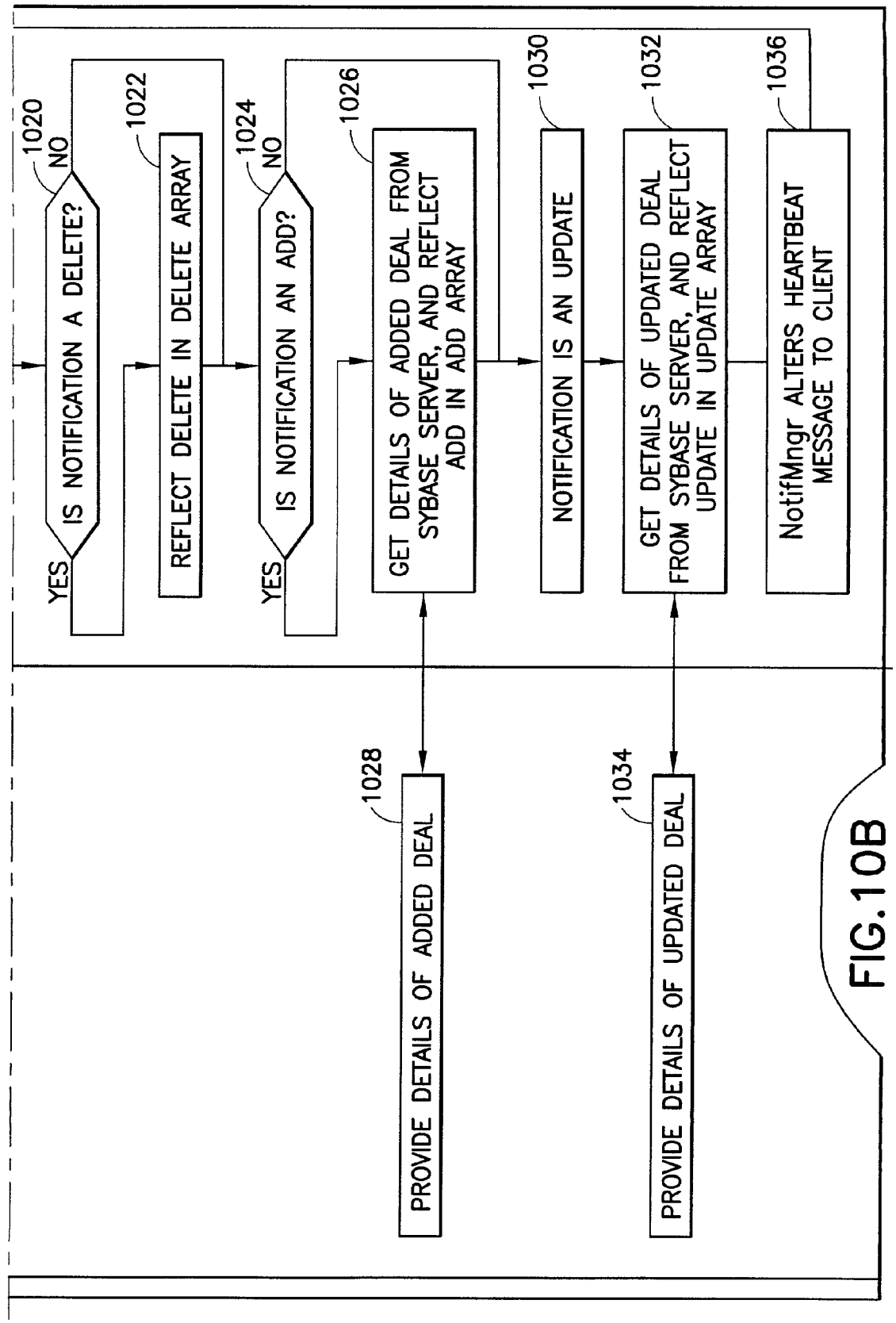
FIG. 10 illustrates steps in a method according to one embodiment of the invention.

Referring now to FIG. 10, steps involving an update to Sybase server 102 are illustrated.

At step 1002, Sybase server 102 determines that there is a change to an element in the database, and at step 1004, stores the database element in Sybase database storage 108 of Sybase server 102. The storage may be any number of different types, most commonly hard disk. The data base elements are also most typically stored by a relational database. Although not illustrated, the step for storing the database element at step 1004 typically includes various rollback, backup and commit steps to ensure that database element changes are not lost, and that the database can be fully recovered in the event of a failure.

At step 1006, the notification server 110 of Sybase server 102 receives an indication of the database element change. This indication of change includes the particular record or deal ID that was added, deleted or updated.

At step 1008, notification server 110 determines whether any "clients" are registered to receive notification of the change. Here, the "client" is the application server 104. As discussed above, at steps 318, 320 of FIG. 3, application server 104 registers with notification server 110 for add, delete and update of certain database elements, such as deals. The registrations at step 318, 320 are what determines which "clients" are registered at step 1008.

If there are no "clients" registered with notification server 110 for the database change, Sybase server 102 loops to step 1002 to wait for another database element change.

If there are "clients" registered with notification server 110 for the database change, then at step 1010, Sybase server 102 generates the change notice message and sends that change notice message to the registered "clients." Sybase server 102 then loops to step 1002 to wait for another database element change.

During the time that Sybase server 102 is waiting for changes in the database, and then sending notice of the change to registered "clients," application server 104 is performing other operations, which include sending a heartbeat message at step 1012 to client browser 102. Until a change in the Sybase server is made and notice of that change is sent to application server 104, the heartbeat message reflects no changes.

When the notification server 110 of Sybase server 102 sends the change notice message at step 1010, the message is received by application server 104 at step 1014, assuming that application server 104 is registered as a "client" to receive notice of the change.

If a change notice message is received by application server 104, then at step 1016, a thread of add, update and delete java beans running on application server 104 detect the change notice message. The change notice message that is sent at step 1010 includes the deal ID, but does not include all of the particulars of the deal. Therefore, where application server 104 needs those particulars, the application server uses the deal ID to submit a request to the Sybase server and retrieves the particulars for the deal.

At step 1018, notification manager 114 of application server 104 checks the type of change notice message. For example, the change notice may be add, delete or update.

At step 1020, notification manager 114 determines whether the change notice message is a delete. If the change notice message is a delete, then at step 1022 delete of that deal or data element is reflected in the delete array, which is held by application server 104.

At step 1024, notification manager 114 of application server 104 determines whether the change notice message is an add. If the change notice message is an add, then at steps 1026, 1028, application server 104 gets information on the added deal or added data element from Sybase server 102, and reflects the added deal or added data element in the add array, which is held by application server 104.

At step 1030, notification manager 114 of application server 104 determines that the change notice message is an update. Then at steps 1032, 1034, application server 104 gets information on the updated deal or updated data element from Sybase server 102, and reflects the updated deal or data element in the update array, which is held by application server 104.

After the add, delete and update deals are reflected in the respective arrays, then at step 1036, notification manager 114 of application server 104 changes the heartbeat message to "refresh" to reflect the change in the Sybase server and sends the "refresh" message to client browser 102.

At step 1038, there is a timer running within notification server 116 of application server 104. Every minute, a thread on each of the add, delete and update beans running in notification server 116 checks the respective arrays to determine, from the timestamp associated with each deal, whether any of the changes to deals reflected in the respective arrays are more than five (5) minutes old. If any of the changes in an array are more than 5 minutes old, that deal ID and associated information is removed from the array. This ensures that each array holds no more than 5 minutes of deals. Sybase database 108 maintains a record of all deals.

Referring now to FIG. 11, steps involving the heartbeat message are illustrated. At step 1102, application server 104 sends a heartbeat message to client browser 106. The heartbeat message is received over the TCP socket connection that was established at steps 428, 430 in FIG. 4. At a minimum, the heartbeat message reflects change or no change.

At step 1104, the applet in the hidden frame (202 of FIG. 2) running on client browser 106 receives the heartbeat message over the TCP socket connection. Within that applet is an instance variable that is set depending on what the heartbeat message says. The javascript polls the applet for the instance variable.

At step 1106, the javascript determines from the instance variable whether the heartbeat message reflects a change. In one embodiment, the heartbeat message becomes "refresh" to reflect the change. If the heartbeat message reflects no change, the javascript within the applet loops to step 1104 to continue monitoring the instance variable.

If the heartbeat message reflects a change, then at steps 1108, 1110, the javascript of client browser 106 causes client browser 106 to make an http request to application server 104 to request the add, delete and update arrays, and in response, the client browser receives the respective arrays that have been added, deleted or updated within the last five (5) minutes. The added and updated deal arrays have complete deal information. The delete deal array has deal ID but no other information.

At step 1112, javascript running on client browser 106 begins a series of decisions and actions to process the deals in the respective arrays against the deals that are currently displayed.

At step 1112, client browser 106 determines whether there are unprocessed deals in the add deal array. If all deals in the add deal array have been processed, then at step 1120, client browser 106 determines whether there are unprocessed deals in the delete deal array.

If there is an unprocessed deal in the add deal array, then at step 1114, client browser 106 fetches that deal.

At step 1116, client browser 106 uses the deal ID from the add deal array to determine if the deal is reflected in the blotter.

If the deal is in the blotter, then at step 1118, the blotter is updated from the add deal array.

If the deal is not in the blotter, then at step 1117, client browses 106 determines whether the deal should be in the blotter. If the deal should be in the blotter, the blotter is updated from the add deal array.

At step 1112, client browser again determines whether there is an unprocessed deal in the add deal array.

If there are no more unprocessed deals in the add deal array, then at step 1120, client browser 106 determines whether there are unprocessed deals in the delete deal array. If all deals in the delete deal array have been processed, then at step 1128, client browser 106 determines whether there are unprocessed deals in the update deal array.

If there is an unprocessed deal in the delete deal array, then at step 1122, client browser 106 fetches that deal.

At step 1124, client browser 106 uses the deal ID from the delete deal array to determine if the deal is reflected in the blotter.

If the deal is in the blotter, then at step 1126, the blotter is updated from the delete deal array.

At step 1120, client browser again determines whether there is an unprocessed deal in the delete deal array.

If there are no more unprocessed deals in the delete deal array, then at step 1128, client browser 106 determines whether there are unprocessed deals in the update deal array. If all deals in the update deal array have been processed, then at step 1104, client browser 106 monitors the heartbeat message.

If there is an unprocessed deal in the update deal array, then at step 1130, client browser 106 fetches that deal.

At step 1132, client browser 106 uses the deal ID from the update deal array to determine if the deal is reflected in the blotter.

If the deal is in the blotter, then at step 1134, the blotter is updated from the update deal array.

At step 1128, client browser again determines whether there is an unprocessed deal in the update deal array.

Although illustrative embodiments have been described herein in detail, it should be noted and will be appreciated by those skilled in the art that numerous variations may be made within the scope of this invention without departing from the principle of this invention and without sacrificing its chief advantages.

For example LiteQuery caching and browser notification are concepts that can be used independent of each other. Alternatively, the two concepts can be used together as described herein.

The invention has been described with reference to illustrations of generally serial or synchronous transactions. However, it is understood that many of the transactions are not serial or synchronous, but are infact asynchronous. Therefore, one transaction may not occur until it is triggered by another transaction.

The browser notification has been described with reference to deals, which are dynamic events. To accomplish browser notification of deals, the application server registers with the Sybase notification server 110 for add, update and delete actions on deals. It is possible to use the same type of browser notification for less dynamic transactions, such as add, delete and update of parties.

Browser notification has been described using Sybase notification server 110. However, it is also possible that changes to the litequery cache generate a change message and the change message is used in a manner that is similar to the notification message from Sybase notification server 110. In particular, a heartbeat type message is used to broadcast a change in data stored in the litequery cache, and upon receipt of the heartbeat type message indicating a change, client browser 106 requests an update of the data that is stored in the litequery cache. In this embodiment, client browser 106 will typically request the data update from the litequery cache rather than from database 108 of Sybase server 102.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method for data display on a client computer, the method comprising:
    sending html from a server to a client, the html including code for a visible frame, a first invisible frame and a second invisible frame;
    rendering the visible frame on a browser of the client;
    populating a first field of the visible frame with static data, the static data contained within the first invisible frame; and
    populating a second field of the visible frame with dynamic data, the dynamic data retrieved by code within the second invisible frame.

2. A method according to claim 1, further comprising using the code within the second invisible frame to validate data entered on the client computer.

3. A method according to claim 1, wherein populating the first field does not require re-rendering the visible frame.

4. A method according to claim 1, wherein populating the second field does not require re-rendering the visible frame.

5. A method according to claim 1, wherein populating the first field does not require a query from the client to the server.

6. A method according to claim 1, wherein:
    the static data is contained within javascript; and
    the dynamic data is not contained within javascript.

7. A method according to claim 1, further comprising:
    receiving an input at an entry field;
    generating a query based on the input;
    transmitting the query;
    receiving a search result based on the query; and
    populating a third field of the visible frame based on the search result.

8. A method according to claim 1, wherein the first invisible frame contains a first java server program and the second invisible frame contains a second java server program.

9. A method according to claim 1, further comprising:
    establishing an application layer connection with the server;
    requesting a specific application resource via the application layer connection;
    establishing a transport layer con connection with the server to receive a message; and
    monitoring to identify changes in the message.

10. A method according to claim 9, further comprising:
    identifying a change in the message;
    requesting an array from the server; and
    updating the visible frame based on the array.

11. A computer readable medium having computer executable code stored thereon, the code for data display on a client computer, the code comprising:
    code to send html from a server to a client, the html including code for a visible frame, a first invisible frame and a second invisible frame;
    code to render the visible frame on a browser of the client;
    code to populate a first field of the visible frame with static data, the static data contained within the first invisible frame; and
    code to populate a second field of the visible frame with dynamic data the dynamic data retrieved from the server by code within the second invisible frame.

12. A programmed computer for data display on a client computer, comprising:
    a memory having at least one region for storing computer executable program code; and a processor for executing the program code stored in the memory, wherein the program code comprises:
    code to send html from a server to a client, the html including code for a visible frame, a first invisible frame and a second in visible frame;
    code to render the visible frame on a browser of the client;
    code to populate a first field of the visible frame with static data, the static data contained within the first invisible frame; and
    code to populate a second field of the visible frame with dynamic data, the dynamic data retrieved from the server by code within the second invisible frame.

13. A method for data display on a client computer, the method comprising:
    responsive to a request from a client, sending html from a server to the client, the html including:
    html code for a visible frame including multiple layers;
    javascript for a first invisible frame; and
    javascript for a second invisible frame;
    rendering the visible frame from the html code on a browser of the client with at least one layer rendered behind a topmost layer so as to cover the layer in back;

populating a first field of the topmost layer of the visible frame with static data, the static data contained within the javascript for the first invisible frame;

populating a second field of the topmost layer of the visible frame with dynamic data, the dynamic data not contained within the html, or javascript, the javascript for the second invisible frame retrieving the dynamic data.

* * * * *